US011263636B2

(12) United States Patent
Butler et al.

(10) Patent No.: US 11,263,636 B2
(45) Date of Patent: Mar. 1, 2022

(54) SYSTEMS FOR PROVIDING AND PROCESSING PRE-AUTHORIZED CUSTOMIZABLE GIFT TOKENS

(71) Applicant: Capital One Services, LLC, McLean, VA (US)

(72) Inventors: Taurean Butler, Brooklyn, NY (US); Christine Berglund, Brooklyn, NY (US); Adam Vukich, Alexandria, VA (US); Jessica Greenberg, New York, NY (US); Colin Hart, Arlington, VA (US); Mykhaylo Bulgakov, Arlington, VA (US); Jason Ji, Reston, VA (US); Kaylyn Gibilterra, New York, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/099,626

(22) Filed: Nov. 16, 2020

(65) Prior Publication Data
US 2021/0142326 A1 May 13, 2021

Related U.S. Application Data

(63) Continuation of application No. 16/450,330, filed on Jun. 24, 2019, now Pat. No. 10,839,398, which is a (Continued)

(51) Int. Cl.
G06Q 20/40 (2012.01)
G06Q 20/38 (2012.01)
G06Q 20/20 (2012.01)

(52) U.S. Cl.
CPC ......... G06Q 20/405 (2013.01); G06Q 20/202 (2013.01); G06Q 20/385 (2013.01)

(58) Field of Classification Search
CPC .......... G06F 21/31; G06F 21/36; G06F 21/46; G06F 2221/2133; G06F 2221/2103;
(Continued)

(56) References Cited

U.S. PATENT DOCUMENTS 6,193,155 B1   2/2001  Walker et al.
8,577,356 B2   11/2013 Kornilovsky et al.
(Continued)

FOREIGN PATENT DOCUMENTS

EP      2410450 A1 *  1/2012  ............. G06F 21/36
EP      2829036 A1    1/2015
WO   2014120051 A1    8/2014

OTHER PUBLICATIONS

Lucy Hattersley, "How to recover a forgotten Mac password," Feb. 20, 2018, MacWorld, pp. 1-3 (Year: 2018).

Primary Examiner — Florian M Zeender
Assistant Examiner — Vanessa Deligi
(74) Attorney, Agent, or Firm — Troutman Pepper Hamilton Sanders LLP; Christopher J. Forstner; John A. Morrissett

(57) ABSTRACT

A method for providing a gift includes receiving a gift token creation request representative of a selection of a gift recipient and gift limitations from a first computing device. The method includes generating a tokenized PAN associated with a gift account and transmitting the tokenized PAN and gift limitations to a second computing device. The method includes detecting a transaction authorization request that is representative of an attempted transaction at a merchant POS device based on monitoring of transaction authorization data originating from a plurality of merchant POS devices. The transaction authorization request represents an attempted tokenized PAN, an attempted transaction amount and a merchant code. The method includes determining that the attempted tokenized PAN matches the tokenized PAN (Continued)

associated with the gift account. The method includes transmitting an authorization message to the merchant POS in response to determining that the transaction authorization request satisfies the gift limitations.

20 Claims, 8 Drawing Sheets

Related U.S. Application Data continuation of application No. 16/014,309, filed on Jun. 21, 2018, now Pat. No. 10,380,596.

(58) Field of Classification Search
CPC ..... G06F 21/32; H04L 63/083; H04L 9/3226; H04L 63/10; H04L 63/0861; H04L 2463/082
See application file for complete search history.

(56) References Cited

U.S. PATENT DOCUMENTS

| | | | |
|---|---|---|---|
| 8,850,603 B2 | 9/2014 | Methenitis | |
| 8,904,479 B1 * | 12/2014 | Johansson | G06F 21/36 |
| | | | 726/2 |
| 9,015,066 B2 | 4/2015 | Scipioni et al. | |
| 9,460,433 B2 | 10/2016 | Proctor, Jr. et al. | |
| 9,483,786 B2 * | 11/2016 | Glass | G06Q 30/06 |
| 9,628,950 B1 | 4/2017 | Noeth et al. | |
| 2003/0200184 A1 | 10/2003 | Dominguez et al. | |
| 2005/0197919 A1 | 9/2005 | Robertson | |
| 2007/0015490 A1 | 1/2007 | Munje et al. | |
| 2007/0250920 A1 * | 10/2007 | Lindsay | G07F 7/1025 |
| | | | 726/7 |
| 2008/0010203 A1 | 1/2008 | Grant | |
| 2008/0024272 A1 | 1/2008 | Fiske | |
| 2008/0243702 A1 | 10/2008 | Hart et al. | |
| 2011/0251962 A1 | 10/2011 | Hruska | |
| 2012/0214442 A1 * | 8/2012 | Crawford | G06F 21/316 |
| | | | 455/411 |
| 2013/0144732 A1 | 6/2013 | Rothschild | |
| 2013/0254036 A1 | 9/2013 | Trinh et al. | |
| 2013/0268440 A1 * | 10/2013 | Tierney | G06Q 20/342 |
| | | | 705/44 |
| 2013/0339188 A1 * | 12/2013 | Mohamed | G06Q 20/027 |
| | | | 705/26.41 |
| 2014/0081761 A1 | 3/2014 | Singonahalli et al. | |
| 2014/0195425 A1 * | 7/2014 | Campos | G06Q 20/3674 |
| | | | 705/41 |
| 2014/0214661 A1 | 7/2014 | Yankovich et al. | |
| 2016/0042434 A1 | 2/2016 | Levitt et al. | |
| 2016/0371668 A1 * | 12/2016 | Priebatsch | G06Q 20/354 |
| 2017/0161781 A1 * | 6/2017 | Parekh | G06Q 30/0269 |
| 2018/0101841 A1 * | 4/2018 | Kohli | G06Q 30/0631 |
| 2018/0165675 A1 * | 6/2018 | Isaacson | G06Q 40/02 |
| 2018/0189769 A1 | 7/2018 | Narasimhan et al. | |
| 2018/0196963 A1 * | 7/2018 | Bandiwdekar | G06F 21/6254 |
| 2018/0293573 A1 | 10/2018 | Ortiz et al. | |
| 2018/0336550 A1 | 11/2018 | Hewitt | |
| 2018/0365682 A1 * | 12/2018 | Ball | G06Q 20/3278 |

* cited by examiner

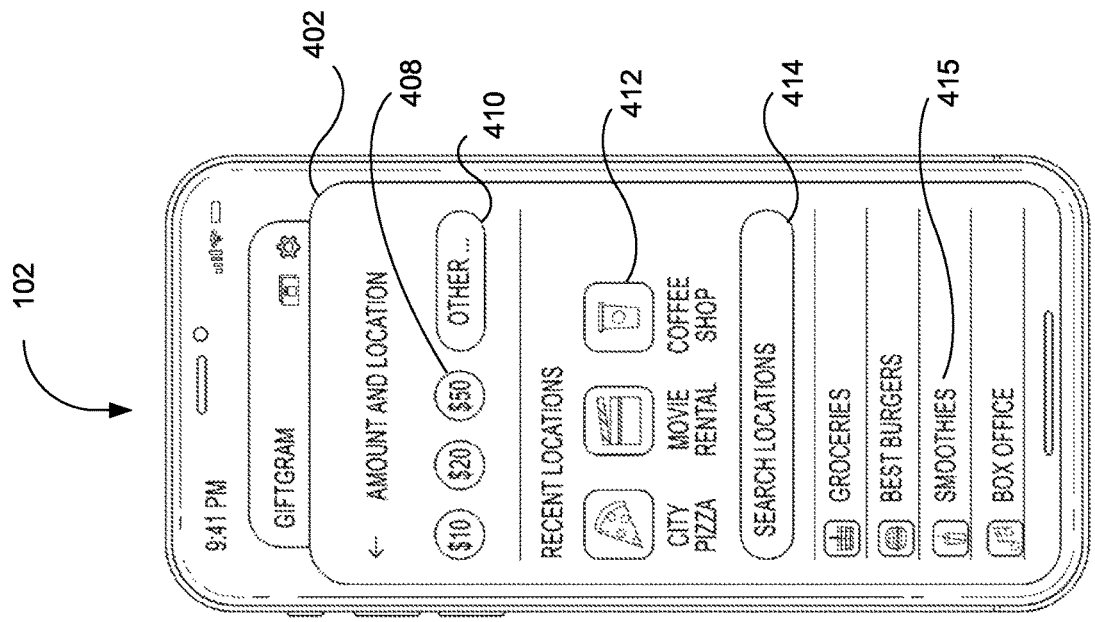
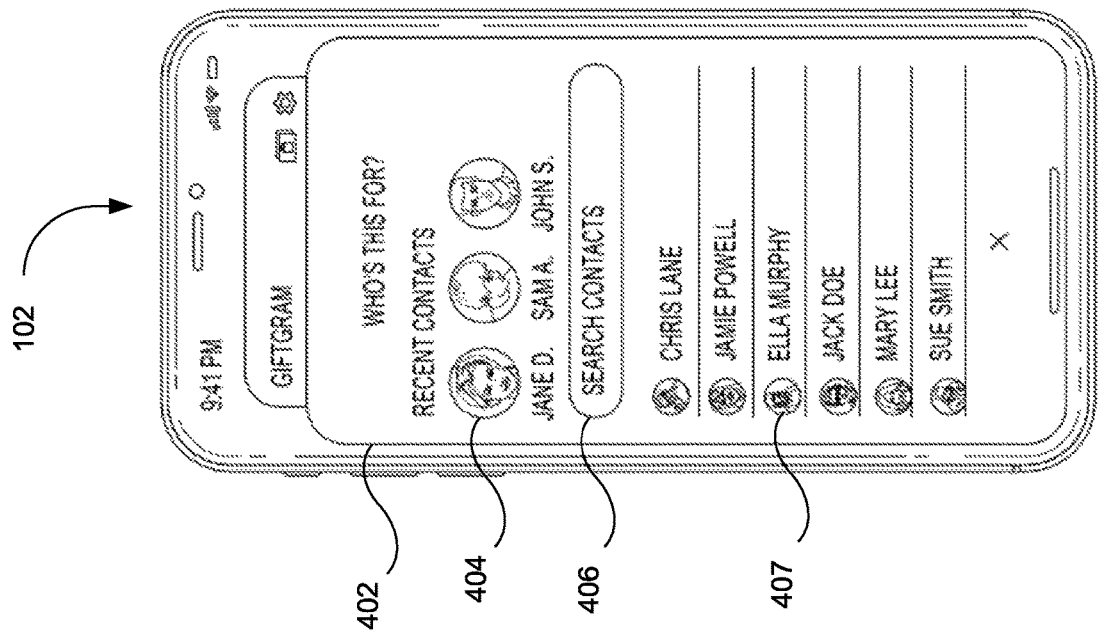
FIG. 4A
FIG. 4B

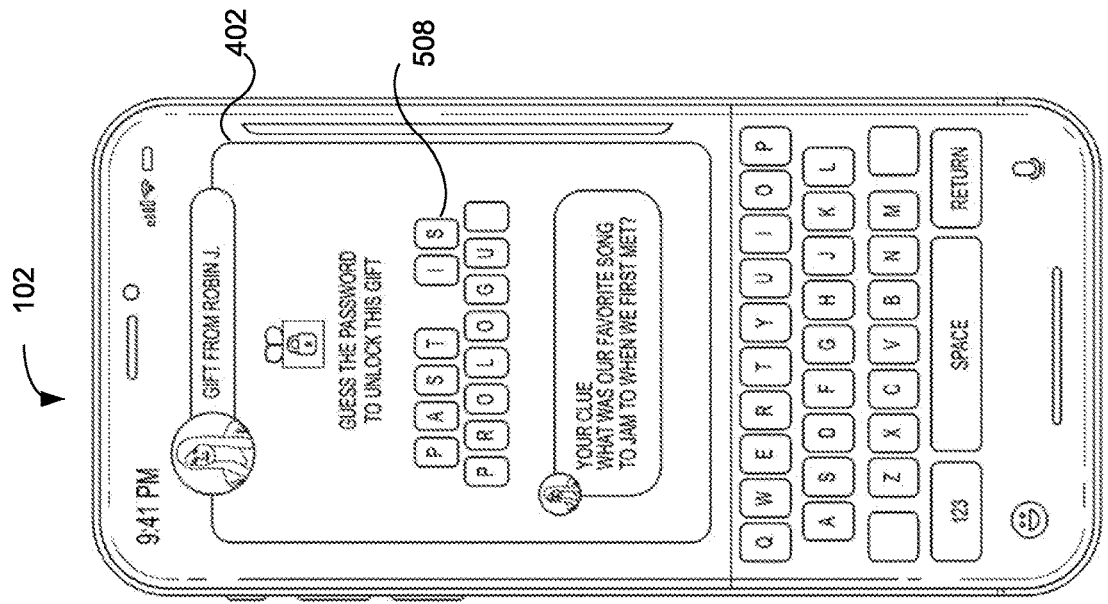
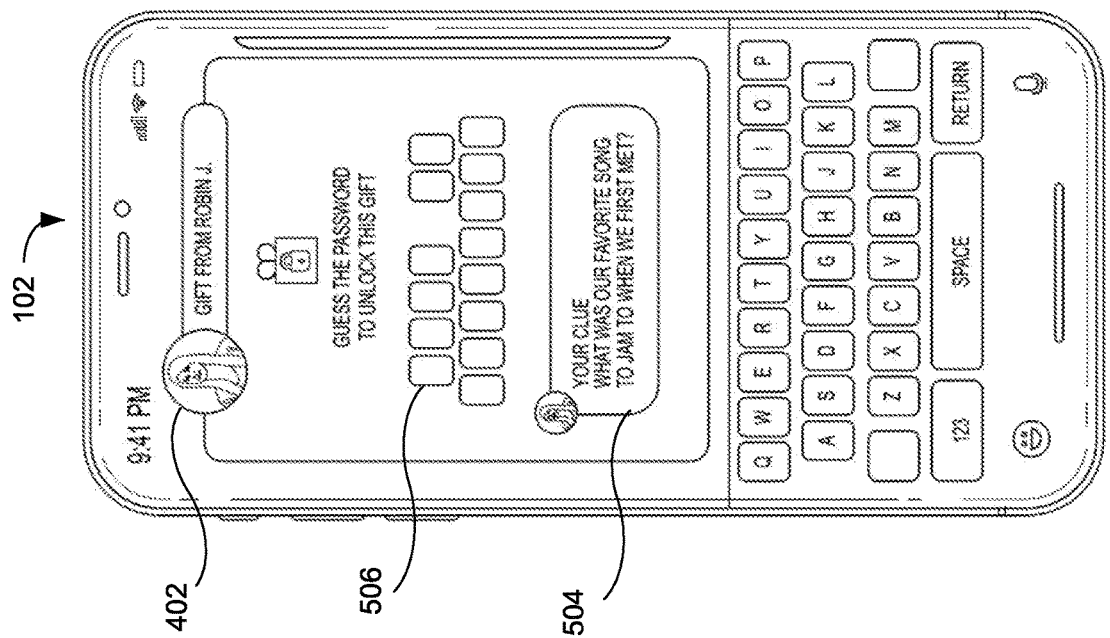
FIG. 5A
FIG. 5B

SYSTEMS FOR PROVIDING AND PROCESSING PRE-AUTHORIZED CUSTOMIZABLE GIFT TOKENS

CROSS REFERENCE TO RELATED APPLICATIONS

This application is a continuation of, and claims priority under 35 U.S.C. § 120 to, U.S. patent application Ser. No. 16/450,330, filed Jun. 24, 2019, which is a continuation of U.S. patent application Ser. No. 16/014,309, filed Jun. 21, 2018, now U.S. Pat. No. 10,380,596, the entire contents and substance of which is hereby incorporated by reference in their entirety.

FIELD OF INVENTION

The present disclosure relates to systems and methods for providing a gift, and more particularly providing systems and methods for allowing a gift recipient to receive and use a tokenized primary account number (PAN) that is linked to a gifter's financial account and that is restricted by use conditions specified by the gifter.

BACKGROUND

Gift cards are a convenient means for people to provide a financial gift to one another that can be more personalized or allotted for a particular use than exchanging cash. To obtain a gift card, a purchaser typically pays an amount matching the desired value of the gift card (plus any gift card fees), receives the physical gift card, and provides it to the recipient for future use with one or more associated merchants that accept the card or for general use (similar to a credit card) depending on the type of gift card. While convenient, conventional gift cards often come with significant drawbacks. For example, conventional gift cards require that the purchaser spend the money to obtain the card before the money can be used by the recipient. Additionally, if the recipient only spends a portion of the value of the gift card or loses possession of the gift card, the recipient will not receive the full value that the gifter paid for the gift card, unnecessarily wasting some of the gifter's money. Furthermore, because conventional gift cards are either tied to specific merchants or available for general use (similar to a credit card), a gifter who wishes to give a customized gift for redemption from a particular merchant may find it unduly burdensome to hunt down a conventional gift card associated with that merchant, or may find that gift cards for the desired merchant do not exist.

Accordingly, there is a need for improved systems that may allow a gifter to provide a financial gift having customizable redemption conditions that are enforced by the system and do not require that the gifter spend money on the gift before the recipient redeems the gift. Embodiments of the present disclosure are directed to this and other considerations.

SUMMARY

Disclosed embodiments provide systems and methods for providing a gift. In some embodiments the gift may be a financial gift that may be provided electronically.

Consistent with the disclosed embodiments, a method of providing a gift may include receiving a gift token creation request from a first computing device. The gift token creation request may comprise data representative of a selection of a gift recipient and gift limitations comprising a maximum gift amount and one or more redemption merchants. The method may include generating, based on the gift token creation request, a tokenized primary account number (PAN) associated with a gift account. The gift account may be a financial account associated with a user of the first computing device. The method may include transmitting the tokenized PAN and data representative of the gift limitations to a second computing device associated with the gift recipient. The method may include detecting, based on monitoring of transaction authorization data originating from a plurality of merchant POS devices, a transaction authorization request that is representative of an attempted transaction at a merchant POS device. The transaction authorization request may comprise data representative of an attempted tokenized PAN, an attempted transaction amount and a merchant category code. The method may include determining that the attempted tokenized PAN matches the tokenized PAN associated with the gift account. The method may further include transmitting an authorization message to the merchant POS device in response to determining that the transaction authorization request satisfies the gift limitations. The authorization message may represent an authorization of the attempted purchase.

Consistent with the disclosed embodiments, systems and non-transitory computer-readable mediums for providing a gift are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings:

FIGS. 4A-B are exemplary embodiments of user interfaces of a software application for providing gifts;

FIGS. 5A-B are exemplary embodiments of user interfaces of an electronic locking mechanism of a software application for providing gifts.

DETAILED DESCRIPTION

Figure 1:
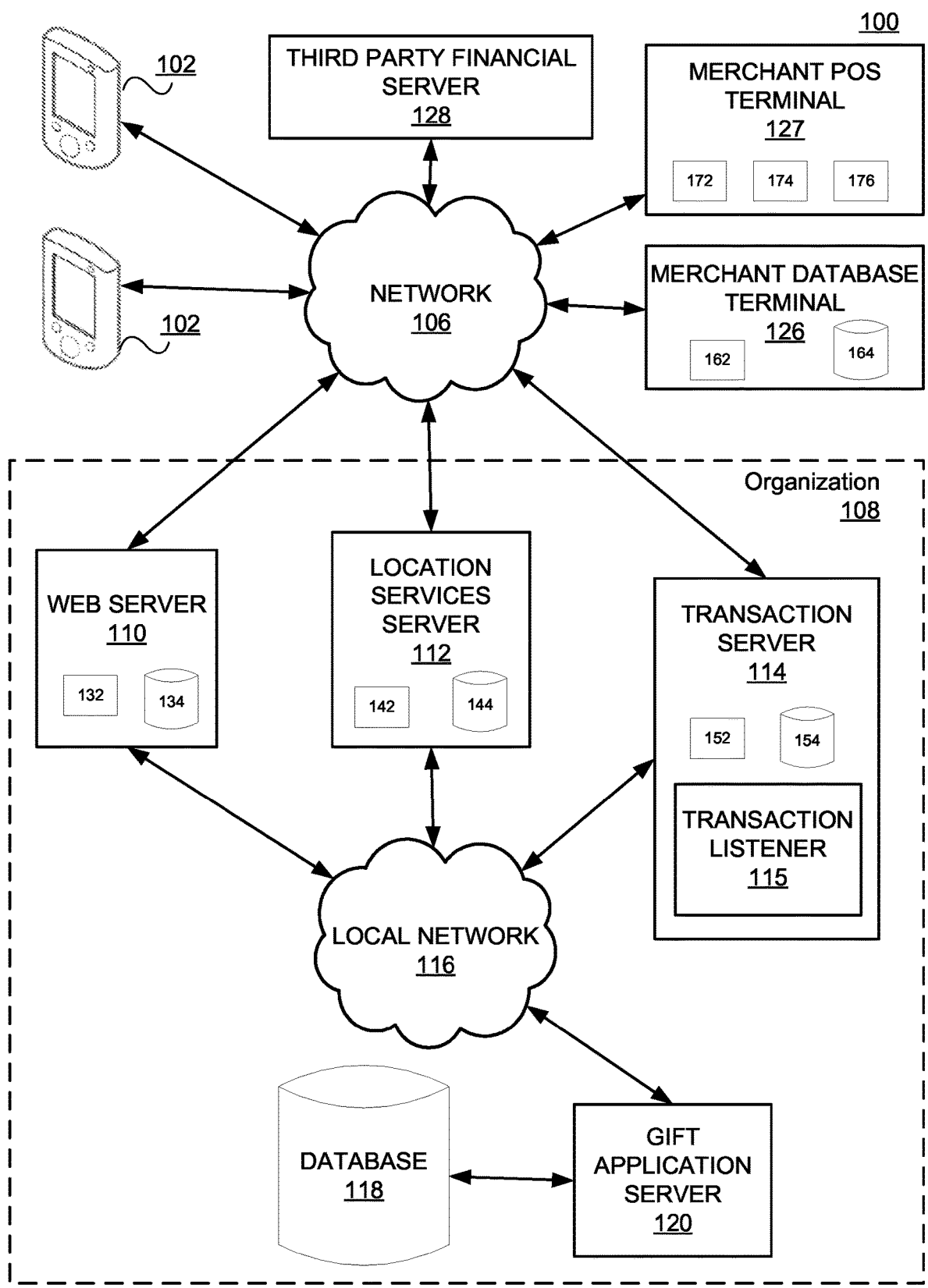
FIG. 1 is a diagram of an exemplary system that may be used to provide a financial gift.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to methods for providing a gift. In one embodiment, a method may include providing a gift may include receiving a gift token creation request from a first computing device, such as mobile device of the gifter. The gift token creation request may include data representative of a selection of a gift recipient and gift limitations comprising a maximum gift amount and one or more redemption merchants, so that the gifter may specify the nature of the gift and the conditions of use. The method may include generating, based on the gift token creation request, a tokenized primary account number (PAN) associated with a gift account. The gift account may be a financial account associated with a user of the first computing device. The method may include transmitting the tokenized PAN and data representative of the gift limitations to a second computing device associated with the gift recipient. For example, the gift recipient may receive a notification on their mobile device indicating that they have received a gift and informing them of the nature of the gift. The method may include detecting, based on monitoring of transaction authorization data originating from a plurality of merchant POS devices, a transaction authorization request that is representative of an attempted transaction at a merchant POS device. The transaction authorization request may comprise data representative of an attempted tokenized PAN, an attempted transaction amount and a merchant code. The method may include determining that the attempted tokenized PAN matches the tokenized PAN associated with the gift account. In this way, the system may identify a transaction that is being made in association with the gift and determine if the attempted transaction qualifies for processing. So, for example, if the gift recipient receives a gift to a movie theater but attempts to redeem the gift at a restaurant, the system may reject the attempted transaction. The method may further include transmitting an authorization message to the merchant POS device in response to determining that the transaction authorization request satisfies the gift limitations. The authorization message may represent an authorization of the attempted purchase. In this way, the system can allow a gifter to provide a gift with customized characteristics, such as where and when the gift may be used, that will be enforced by the system so that the gifter will not be charged for gifts that go unused or gifts that are not used in accordance with the restrictions placed on the gift by the gifter. Further, by using transaction authorization request data to identify the merchant at which a gift is used, it may allow a user of the system to create a gift to a wide variety of merchants without requiring the merchant to be registered with the system, thereby allowing a user to create a customized gift to a merchant at which gifts may not otherwise be available for purchase.

In another embodiment, a method for providing a gift is disclosed. The method may include receiving a gift token issuance notification comprising a gift primary account number (PAN) associated with a gifter financial account and gift limitations. The gift limitations may comprise a maximum gift amount, a gift expiration date, and one or more redemption merchants. The method may include monitoring a plurality of transaction authorization requests. Each of the plurality of transaction authorization requests may comprise an attempted primary account number (PAN), an attempted transaction date, an attempted transaction amount and a merchant code. The method may include detecting, based on the monitoring of the plurality of transaction authorization requests, a gift transaction authorization request, wherein the gift transaction authorization request comprises an attempted PAN that matches the gift PAN associated with the gifter financial account and the gift transaction authorization request that is associated with an attempted transaction made at a merchant POS device. The method may include determining, based on the merchant code of the gift transaction authorization request, an identity of a merchant associated with the merchant POS device. The method may include generating a transaction authorization in response to determining that the identity of the merchant matches one of the one or more redemption merchants and an attempted transaction date associated with the gift transaction authorization request chronologically precedes the gift expiration date. The method may include transmitting the transaction authorization to the merchant POS device. The method may further include outputting instructions to debit the gifter financial account an amount equal to a gift amount.

In another embodiment, a method for providing a gift is disclosed. The method may include receiving a gift notification comprising data representative of a tokenized primary account number (PAN), a maximum gift amount and gift limitations. The gift limitations may include one or more redemption merchants representative of merchants at which the tokenized PAN is authorized to be used to make a purchase and a gift expiration date representative of the date upon which the tokenized PAN is no longer authorized to be used to make a purchase. The method may include storing the tokenized PAN and receiving a user input representative of a selection of the stored tokenized PAN as a payment method in association with a transaction. The method may include conveying the stored tokenized PAN to a merchant POS device in association with the transaction to pay for at least a portion of the transaction, wherein the merchant POS device is associated with one of the one or more redemption merchants and the transaction is made prior to the gift expiration date. The method may further include receiving a gift balance notification. The gift balance notification provides a remaining balance associated with the tokenized PAN.

In another embodiment, a system may include one or more memory devices storing instructions, and one or more processors configured to execute the instructions to perform steps of a method of providing a gift as disclosed herein.

In another embodiment, a non-transitory computer-readable medium is disclosed. The non-transitory computer-readable medium may store instructions that, when executed by one or more processors, cause a system to execute a method of providing a gift as disclosed herein.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system 100 that may be configured to perform one or more processes that may allow a first user of a first computing device to send a customized financial gift comprising a tokenized primary account number (PAN) to second computing device for use by a second user. System 100 may be configured to allow the first user (who may be referred to as the "gifter") to send the financial gift without making any payment for the gift until the gift is redeemed by the second user (who may be referred to as the "gift recipient"). System 100 may be configured to allow the gifter to specify one or more gift limitations or conditions that may constrain the use of the gift, such as for example, a maximum gift amount that the redemption of the gift may not exceed, one or more redemption merchants (e.g., particular stores or vendors) or types of redemption merchants (e.g., restaurants, movie theaters, etc.) at which the gift is authorized to be redeemed, an expiration date by which the gift must be used before it expires, a condition that specifies use of the in association with card not present or card present transactions (i.e. whether or not the a payment card is present for the transaction), conditions on the number of uses of the gift (e.g., one-time use or multiple uses) or any other such types of conditions or limitations that may be created or enforced based on transaction authorization data or via administration of the gift mobile application. According to some embodiments, the gift recipient may receive and store the tokenized PAN on the second computing device for future use. In some embodiments, the tokenized PAN may be stored by, for example, a digital wallet associated with the second computing device. A stored tokenized PAN may be used to make a purchase in conjunction with electronic payment systems, such as, for example, a mobile payment system that uses near-field communication (NFC) to receive the tokenized PAN, a merchant terminal having an scanner or image capture device that may obtain an image or optical scan of an image of the tokenized PAN displayed by a screen of a user device, or a system that may receive a user input representative of the tokenized PAN via, for example, typed entry of the tokenized PAN into a keypad of the merchant terminal. According to some embodiments, upon detection by system 100 that the financial gift has partially or fully been redeemed, the system may debit a financial account of the first user with an amount corresponding to the redeemed gift. The components and arrangements shown in FIG. 1 are not intended to limit the disclosed embodiments as the components used to implement the disclosed processes and features may vary. As shown, system 100 may include a pair of user devices 102, a network 106, a merchant database terminal 126, a merchant POS terminal 127, a third party financial server 128, and an organization 108 including, for example, a web server 110, a location services server 112, a transaction server 114, a local network 116, a database 118 and a gift application server 120.

In some embodiments, a gifter and gift recipient may operate separate user devices 102, respectively. User device 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of organization 108. According to some embodiments, user device 102 may communicate with a merchant database terminal 126, merchant POS terminal 127 and/or third party financial server 128 via network 106. In some embodiments, user device 102 may include or incorporate electronic communication devices for hearing or vision impaired users. In some embodiments, one or more user devices 102 may include software that is configured to allow a user to generate and send a financial gift to another user (which may be herein referred to as the "gift mobile application").

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Organization 108 may be associated with an entity such as a business, corporation, individual, partnership, or any other entity that provides one or more of goods, services, and consultations to individuals such as customers. For example, in some embodiments, organization 108 may be associated with a financial services provider.

Organization 108 may include one or more servers, devices, and computer systems for performing one or more functions associated with products and/or services that organization 108 provides. Such servers, devices, and computer systems may include, for example, web server 110, location services server 112, transaction server 114, database 118 and gift application server 120, as well as any other computer systems necessary to accomplish tasks associated with organization 108 or the needs of customers (which may be customers of the entity associated with organization 108).

Web server 110 may include a computer system configured to generate and provide one or more websites accessible to customers, as well as any other individuals involved in organization 108's normal operations. Web server 110 may include a computer system configured to receive communications from user device 102 via for example, a mobile application, a chat program, an instant messaging program, a voice-to-text program, an SMS message, email, or any other type or format of written or electronic communication. Web server 110 may have one or more processors 132 and one or more web server databases 134, which may be any suitable repository of website data. Information stored in web server 110 may be accessed (e.g., retrieved, updated, and added to) via local network 116 and/or network 106 by one or more devices of system 100. According to some embodiments, web server 110 may host websites, data or software applications that user device 102 may access and interact with. For example, web server 110 may provide a website, web portal or software application that allows a user of user device 102 to access or view account information associated with one or more financial accounts of the user. In some embodiments, web server 110 may receive and forward communications or portions of communications between user device 102 and components of system 100, such as location services server 112, transaction server 114, database 118 and/or gift application server 120. According to some embodiments, web server 110 may be configured to transmit data and/or messages from a first user device 102 to a second user device 102, via for example, a mobile application that has been downloaded on one or both user devices 102.

Location services server 112 may include a computer system configured to track the location of user device 102 based on information and data received from user device 102. For example, location services server 112 may receive location data from user device 102, such as global positioning satellite (GPS) data comprising the coordinates of the device, RFID data of associated with known objects and/or locations, or network data such as the identification, location, and/or signal strength of a wireless base station (e.g., Wi-Fi router, cell tower, etc.) connected to user device 102 that may be used to determine the location of user device 102. According to some embodiments, location services server 112 may store geofencing information that represents a designed location or area. As those of skill in the art will appreciate, a geofence may be a virtual geographic boundary that when crossed by user device 102, may trigger system 100 to execute one or more actions. According to some embodiments, the contours of a geofence may be predetermined, for example, location services server 112 may receive one or more predetermined geofences that are associated with respective locations from a third party. For example, location services server 112 may receive data representative of a geofence around a particular store from an organization associated with the store that determined the location of the geofence. In some embodiments, the contours of a geofence may be determined by receiving (e.g., from a user of system 100) the location of a point (e.g., longitude and latitude) and a radius and setting the contours of the geofence to be equal to the location of a circle draw around the point at the specified radius. In some embodiments, a geofence may be specified by a user of system 100 by, for example, drawing the geofencing onto a virtual map or otherwise inputting the location of the geofence.

Location services server 112 may have one or more processors 142 and one or more location services databases 144, which may be any suitable repository of location data. Information stored in location services server 112 may be accessed (e.g., retrieved, updated, and added to) via local network 116 and/or network 106 by one or more devices of system 100. In some embodiments, location services server processor 142 may be used to determine the location of user device 102, whether user device 102 has crossed a particular geofence or whether user device 102 is inside or outside of an area designated by a particular geofence. In some embodiments, location services server 112 may be configured send messages and/or data to other devices, such as for example, user device 102 or gift application server 120, upon determining that user device 102 has crossed a specified geofence or entered an area encompassed by a specified geofence. For example, in some embodiments, location services server 112 may send user device 102 a notification that the user of user device 102 has received a gift, and may provide, for example, the details of the gift, which may include a tokenized PAN. According to some embodiments, location services server 112 may receive data representative of a location that is associated with a gift. For example, gift application server 120 may provide data to location services server 112 representative of a location of a particular store that is associated with a particular gift. Location services server 112 may generate, receive or access geofence information associated with the received location and may monitor location data associated with the user device 102 of a designated gift recipient to determine when the user device 102 has entered the location. Location services server 112 may determine that user device has entered the location by determining that, for example, user device has crossed over the geofence associated with the gift. In this way, location services server 112 may determine when a gift recipient has entered a location or proximity to a redemption merchant specified by the gifter.

Transaction server 114 may include a computer system configured to process one or more transactions involving a financial account associated with a customer. For example, a transaction may be a purchase of goods or services from a merchant that is made in association with a financial account, such as a bank account or a credit card account. Transactions may be made at merchant POS terminal 127 by for example, swiping a credit card or making a payment using financial account information stored on a smartphone in a digital wallet. Such transactions may be made at merchant locations or at a merchant website via the internet. Transactions may be made using for example, a credit card, a debit card, a gift card, or other ways of conveying financial account numbers and/or account credentials that are known in the art. Transaction server 114 may have one or more processors 152 and one or more transaction server databases 154, which may be any suitable repository of transaction data. Information stored in transaction server 114 may be accessed (e.g., retrieved, updated, and added to) via local network 116 and/or network 106 by one or more devices of system 100. As described in more detail below, transaction server 114 may store specified account numbers or PANs that may be the subject of transaction monitoring, as well as associated rules, limitations or restrictions that may be applied to an attempted transaction associated with the specified account number/PAN to determine whether to authorize the attempted transaction.

As will be appreciated of those of skill in the art, a credit card may conventionally include a primary account number (PAN) that is a numerical code that is typically between 14 and 16 digits long. In some embodiments, the first six digits of the PAN represent a credit card network, the next set of digits represent a user account number and one or more final digits may represent an additional fraud security digit. According to some embodiments, upon swiping a credit card at merchant POS terminal/device or entering the PAN into a website to make an online purchase, transaction server 114 may receive transaction authorization data representative of the attempted transaction. Such transaction authorization data may include the PAN associated with the card used to make the attempted purchase, and may include other information related to the transaction or merchant, such as the amount of the attempted transaction, the date and time of the attempted transaction, and a merchant category code (which may be referred to herein as a "merchant code") associated with the merchant at which the transaction was attempted. According to some embodiments, transaction server 114 may receive transaction authorization requests comprising transaction authorization data and may make a determination as to whether or not the transaction should be authorized. According to some embodiments, if transaction server 114 determines that the attempted transaction is authorized, transaction server 114 may generate an authorization message and transmit the authorization message to the merchant (e.g., to a merchant POS terminal or merchant database terminal) to authorize the transaction. According to some embodiments, in determining whether to authorize a particular attempted transaction, transaction server may identify a financial account associated with the credit card used to make the attempted purchase, and compare the attempted transaction data to a set of rules that apply to the identified financial account. For example, a particular credit card account may have an associated rule that sets the maximum balance on the account to $1,000, and so if transaction server 114 determines that the current balance on the account is $600 and the attempted purchase is for an item that costs $500, then transaction server 114 may reject the attempted transaction by generating and transmitting a rejection message to the merchant. Such rules may include maximum balance limits, minimum balance limits, restrictions on geographic locations, restrictions relating to the time and date of the transaction, or restrictions relating to the type or identify of the merchant at which an attempted transaction is made. In some embodiments, transaction sever 114 may store and update an account balance associated with a financial gift. For example, if a gifter gives a gift of $100 to a gift recipient, transaction server may set the initial account balance of the gift account to be $100 and may reduce the balance in accordance with any associated authorized transactions made against the account. According to some embodiments, transaction server 114 may store a particular set of rules, limitations or restrictions that are associated with a specified financial account and may apply the particular set of rules to attempted transactions that are determined to be associated with the specified financial account to determine whether the attempted transaction will be authorized. According to some embodiments, transaction server 114 may store a set of rules to be applied to attempted transactions associated with a specified PAN based on a set of gift limitations that are associated with the specified PAN. For example, a set of gift limitations may specify that a particular PAN may only be used for transactions at a certain identified merchant, a certain type of merchant, a certain location, for transactions up to a certain aggregate or maximum gift amount, on, before or after a specified date and/or time, or other such restrictions that may be specified by a gifter in association with a financial gift. Attempted transactions that satisfy the associated rules, limitations and restrictions may be referred to as gift-eligible transactions.

In some embodiments, in response to authorizing a transaction, transaction server 114 may store a record of the transaction and update account information such as the balance of the account. Although the preceding description was made with respect to a credit card, it should be understood that other embodiments relating to other types of payment methods such as debit cards, gift cards, and any other such type of financial account, including online financial accounts, are contemplated as well.

According to some embodiments, transaction server 114 may determine the identity of a merchant associated with an attempted transaction based on the merchant category code included in the transaction authorization data and/or other transaction authorization data such as the zip code and country code. For example, in some embodiments, transaction server 114 may be configured to determine the identity of the business, such as a particular chain of fast food restaurants, based on the merchant category code. According to some embodiments, transaction server 114 may determine information about the merchant associated with a transaction such as the merchant's name, type/category of merchant, location, address and the like, by utilizing third party data and/or machine learning techniques to derive such information. According to some embodiments, transaction server 114 may be configured to determine one or more of a merchant description, a merchant name, a merchant location/address/zip code/country code based on a transaction ID associated with the transaction. In some embodiments, transaction server 114 may be configured to determine the location or address of the attempted purchase based on the merchant category code or other data provided with a transaction authorization request. According to some embodiments, if the identity of the merchant may not be determined solely based on the merchant category code, it may be determined based on the merchant category code in conjunction with the location information derived from the transaction authorization request. In some embodiments, transaction server 114 may be configured to determine the type of business at which the attempted transaction is made based on the merchant category code, such as whether the merchant is a restaurant, gas station, book store, movie theater or the like. In some embodiments, transaction server 114 may cleanse the raw transaction data and output transaction data that human readable. For example, transaction server 114 may receive transaction authorization data associated with a transaction that has a transaction ID of NCPI567 and may cleanse the transaction to output that the transaction took place at a restaurant called "Burger Joint" that is located at 123 Main Street. By using transaction authorization request data to identify the merchant at which a gift is used, system 100 may allow a gifter to create a customized gift to a wide variety of merchants without requiring the merchant to be registered with the system, thereby allowing a user to create a customized gift to a merchant at which gifts may not otherwise be available for purchase.

According to some embodiments, transaction server 114 may include a transaction listener 115 that may be configured to monitor transaction authorization data that originates from, for example, one or more merchant POS terminals or devices. According to some embodiments, transaction listener 115 may monitor incoming transaction authorization requests to identify attempted transactions that are associated with a stored PAN. For example, for each attempted transaction, transaction listener 115 may compare the PAN associated with the attempted transaction with a specified PAN to identify all attempted transactions associated with the specified PAN. For example, transaction listener 115 may identify one or more attempted transactions associated with a particular credit card account by monitoring transaction authorization request data to identify attempted transactions that were made in association with payment method associated with a PAN that matches the PAN of the specified credit card. According to some embodiments, transaction listener 115 may receive transaction authorization requests in real time if, for example, a financial account associated with the attempted payment method is part of a network associated with organization 108. In some embodiments, transaction listener 115 may receive a batch of transaction authorization requests at a particular time, such as at the end of the day, if, for example, the financial account associated with the attempted payment method is not part of a network associated with organization 108. Accordingly, in some embodiments, transaction listener 115 may monitor transaction authorization data in real time (or, in very close temporal proximity to when each attempted transaction is made), and in some embodiments transaction listener 115 may monitor transaction authorization data in batches at specified intervals, or some combination of both. In this way, transaction server 114 may be configured to monitor, identify and authorize or reject attempted transactions associated with a specified financial account in real time and/or intermittently at intervals.

According to some embodiments, transaction server 114 may be configured to send and/or initiate payments from a financial account in response to authorizing an attempted transaction associated with the account. For example, if transaction server 114 authorizes a particular transaction made using a specified financial account at a merchant, then transaction server 114 may generate an instruction to debit the specified financial account with the amount of the transaction and credit an account associated with the merchant with the same amount. In some embodiments, if transaction server 114 authorizes an attempted transaction associated with a tokenized PAN, then transaction server may initiate a payment from an account associated with the tokenized PAN to a merchant at which the payment was made.

Local network 116 may comprise any type of computer networking arrangement used to exchange data in a localized area, such as WiFi, Bluetooth™ Ethernet, and other suitable network connections that enable components of organization 108 to interact with one another and to connect to network 106 for interacting with components in system environment 100. In some embodiments, local network 116 may comprise an interface for communicating with or linking to network 106. In other embodiments, components of organization 108 may communicate via network 106, without a separate local network 116.

According to some embodiments, database 118 may be a database associated with organization 108 and/or its related entity that may store a variety of information relating to customers, transactions, customer information, and business operations. Database 118 may also serve as a back-up storage device and may contain data and information that is also stored on, for example, local databases associated with web server 110, location services server 112, transaction server 114, or gift application server 120. Database 118 may be accessed by other devices and may be used to store records of every interaction, communication, and/or transaction a particular customer has had with organization 108 and/or its related entity. According to some embodiments, database 118 may store data associated with current or past gifts sent or received by users of system 100, such as for example, data identifying a sender of a gift, a receiver of a gift, an amount of a gift, an account designated to pay for the gift or to receive a reimbursement for the gift, the stores and/or types of stores that the gift is authorized to be redeemed at, electronic lock information associated with a gift, an expiration and/or an authorized usage date of a gift, and any other such information that may be pertinent to the provision of a gift.

Gift application server 120 may include a computer system configured to facilitate the purchase and sending of a gift from a gifter that may be associated with a first user device 102 to a gift recipient that may be associated with a second user device 102. According to some embodiments, gift application server 120 may generate an electronic gift associated with a gifter financial account in response to receiving gift information via, for example, a software application running on user device 102.

For example, gift application server 120 may receive a gift token creation request from user device 102 associated with a gifter. In some embodiments, a gift token creation request may comprise data representative of a selection of a gift recipient and gift limitations. According to some embodiments, the selection of a gift recipient may be any information sufficient to identify an individual, such as a name, a username, a handle, a phone number, an address, an email address, or the like. According to some embodiments, gift limitations may be restrictions on use of the gift that are specified by the gifter, such as a maximum gift amount, one or more redemption merchants (e.g., a particular business or chain of stores) at which the gift may be redeemed, one or more types of merchants (e.g., restaurants, movie theaters, etc.) at which the gift may be used, one or more geographic locations at which the gift may be used, date and time restrictions on use, and the like. In some embodiments, a gift token creation request may include an identification of a financial account associated with the gifter, which may be referred to as a gift account, from which the funds for the gift may ultimately be drawn. Gift application server 120 may generate a tokenized PAN that is associated with the gift account. According to some embodiments, a tokenized PAN may be a PAN that enables transactions to be made on an underlying account but that may be subject to certain rules and limitations. For example, if the gifter has a credit card having a PAN of 1234-5678-9999-1111 that is associated with an account number (i.e., a financial account), then gift application server may create a tokenized PAN of, for example, 1234-5678-9999-2222 that is associated with the same underlying account number. Accordingly, the tokenized PAN may have a different number than the PAN associated with the credit card, but may be linked to the credit card PAN by gift application server 120 such that if a transaction is processed using the tokenized PAN, the amount will be debited to the financial account associated with the credit card. According to some embodiments, gift application server 120 may transmit the tokenized PAN and any associated gift limitations to transaction server 114 for monitoring/authorization and to user device 102 associated with the gift recipient for future use of the gift. According to some embodiments, gift application server 120 may, for example upon receiving a notification from transaction server 114 that the gift has been successfully used, generate and transmit a message to user device 102 associated with the gifter to notify the gifter that gift was used and provide details such as the amount spent, the time, date, and location/merchant at which the gift was used.

Merchant database terminal 126 may have one or more processors 162 and one or more merchant databases 164, which may be any suitable repository of merchant data. Merchant database terminal 126 may be located at the POS location, off-site at another merchant location, or at a third-party location. Information stored in merchant database terminal 126 may be accessed (e.g., retrieved, updated, and added to) via network 106 by one or more devices (e.g., service provider terminal 110) of system 100. In other embodiments, merchant POS terminal 127 may be configured to process online transactions on behalf of the associated merchant. Merchant database 164 may store information relating to products and services offered by merchants such as pricing, quantity, availability, discounts, reviews, and any other such generally available information that a consumer may utilize in making a purchasing decision. In some embodiments, merchant database 164 may also include location information associated with products and services that identifies the location(s) that a particular product or service is available for purchase. In some embodiments, the location information may include an identification of a particular store, terminal, or kiosk that the product or service may be purchased from.

Merchant POS terminal 127 may have one or more POS devices 172, 174, 176 that communicate with one or more devices (e.g., user device 102) of system 100 via network 106. In some embodiments, POS devices 172, 174, 176 may devices that are configured to receive or obtain payment information from user device 102. For example, one or more POS devices 172 174, 176 may include a near-field communication interface, a Bluetooth communication interface, a WiFi communication interface, or any other such communication interface that may enable communication between merchant POS terminal 127 and user device 102. In some embodiments, one or more POS devices 172, 174, 176 may include a scanner for scanning images or data that convey payment information displayed by user device 102, an image capture device for capturing images displayed by user device 102, a card-reading device for obtaining payment information from a card (e.g., by reading a chip imbedded in the card or reading information from a magnetic strip), or a keypad for receiving a user input representative of payment information (e.g., a typed credit card number).

Third party financial server 128 may include a computer system configured to store information related financial accounts, such as checking accounts, savings accounts, credit cards accounts, and the like. For example, third party financial server 128 may store account numbers, PANs, balances, transaction data, fund transfer information, and user account information. According to some embodiments, a gifter and/or a gift recipient may have one or more financial accounts associated with third party financial server. In some embodiments, transaction server 114 and/or gift application server 120 may be configured to send instructions to third party financial server 128 via network 106 to cause third party financial server 128 to debit a financial account associated with third party financial server 128 or initiate a transfer of funds between financial accounts, such as an account of the gifter and an account of the gift recipient. Accordingly, in some embodiments, gift application server 120 may store login credentials of financial accounts associated with the gifter and/or gift recipient and transmit such credentials to third party financial server 128 as necessary to initiate such transactions.

Although the preceding description describes various functions of a web server 110, location services server 112, transaction server 114, database 118, gift application server 120, merchant database terminal 126, merchant POS terminal 127 and third party financial server 128, in some embodiments, some or all of these functions may be carried out by a single computing device. For example, some or all of the functions of web server 110, location services server 112, transaction server 114, database 118 and gift application server 120 may be carried out by a single device.

For ease of discussion, embodiments may be described in connection with use of a mobile application on a mobile device to create, customize, send and receive, and in particular, financial gifts that may be redeemed at specified merchants. It is to be understood, however, that disclosed embodiments are not limited to use of a mobile application on a mobile device, but also contemplates embodiments using desktop computers to create, send and/or receive electronic gifts as well as the printing of indicia of a received gift for redemption at a merchant by a printer associated with a computing device of the gift recipient. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

Figure 2:
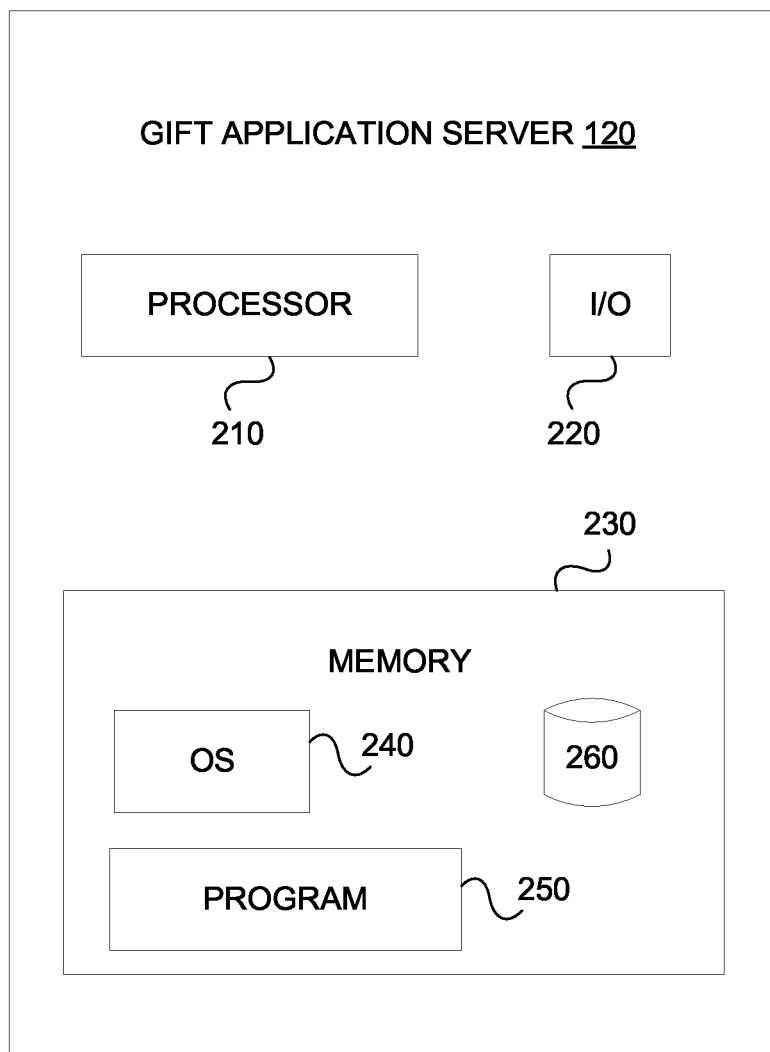
FIG. 2 is a component diagram of an exemplary gift application server.

An exemplary embodiment of gift application server 120 is shown in more detail in FIG. 2. Web server 110, location services server 112, transaction server 114, merchant database terminal 126, merchant POS terminal 127, third party financial server 128 and/or user device 102 may have a similar structure and may include many components that are similar to or even have the same capabilities as those described with respect to gift application server 120. As shown, gift application server 120 may include a processor 210, an input/output ("I/O") device 220, a memory 230 containing an operating system ("OS") 240 and a program 250. For example, gift application server 120 may be a single device or server or may be configured as a distributed computer system including multiple servers, devices, or computers that interoperate to perform one or more of the processes and functionalities associated with the disclosed embodiments. In some embodiments, gift application server 120 may further include a peripheral interface, a transceiver, a mobile network interface in communication with the processor 210, a bus configured to facilitate communication between the various components of gift application server 120, and a power source configured to power one or more components of gift application server 120.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™ ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Gift application server 120 may include one or more storage devices configured to store information used by processor 210 (or other components) to perform certain functions related to the disclosed embodiments. In some embodiments, gift application server 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, gift application server 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, gift application server 120 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments. In some embodiments, gift application server 120 may include a program that when executed, processes a request from a gifter to provide a gift to a gift recipient and creates, provides and administers the gift as disclosed herein.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a database 260 for storing related data to enable gift application server 120 to perform one or more of the processes and functionalities associated with the disclosed embodiments.

Gift application server 120 may also be communicatively connected to one or more memory devices (e.g., databases) locally or through a network. The remote memory devices may be configured to store information and may be accessed and/or managed by CSR terminal 122. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases.

Gift application server 120 may also include one or more I/O devices 220 that may comprise one or more interfaces for receiving signals or input from devices and providing signals or output to one or more devices that allow data to be received and/or transmitted by gift application server 120. For example, gift application server 120 may include interface components, which may provide interfaces to one or more input devices, such as one or more keyboards, mouse devices, touch screens, track pads, trackballs, scroll wheels, digital cameras, microphones, sensors, and the like, that enable gift application server 120 to receive data from one or more users. Gift application server 120 may include a display, a screen, a touchpad, or the like for displaying images, videos, data, or other information.

In exemplary embodiments of the disclosed technology, gift application server 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

Figure 3:
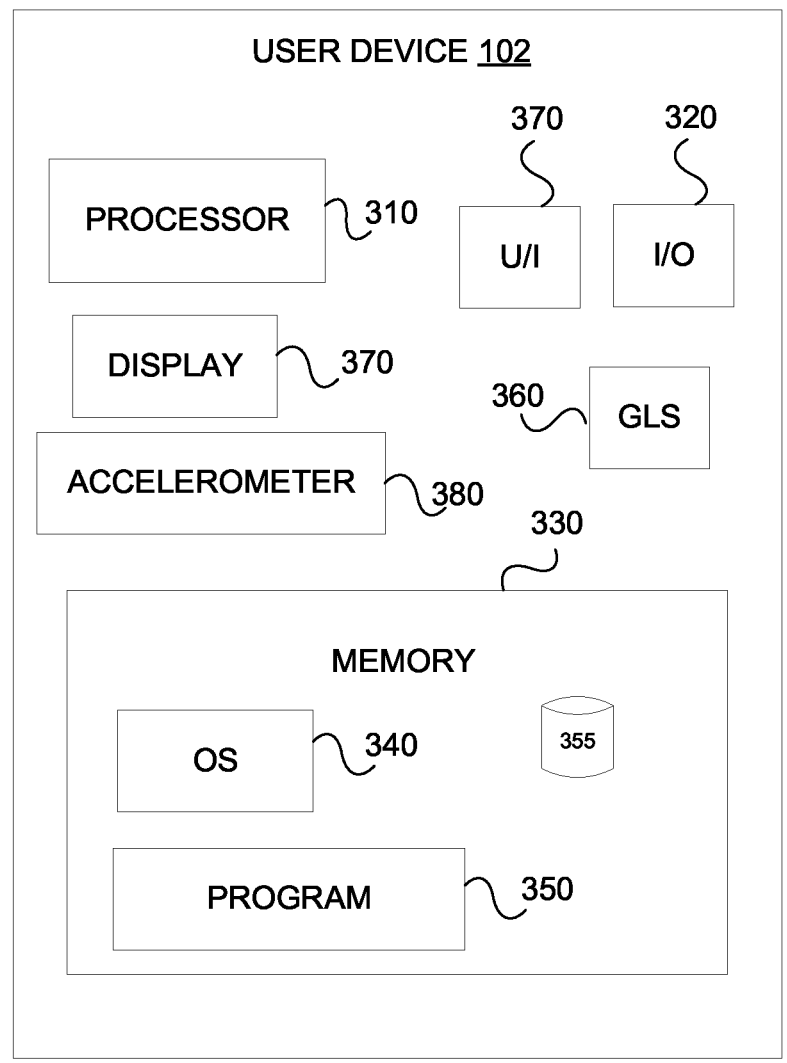
FIG. 3 is a component diagram of an exemplary user device.

FIG. 3 shows an example embodiment of user device 102. As shown, user device 102 may include a processor 310; an input/output ("I/O") device 320; a memory 330 containing an operating system ("OS") 340, a database 355, which may be any suitable repository of data, which may include a digital wallet for storing digital gifts and payment information, and/or a program 350; a geographic location sensor ("GLS") 360 for determining the geographic location of user device 102; a user interface ("U/I") device 370 for receiving user input data, such as data representative of a click, a scroll, a tap, a press, or typing on an input device that can detect tactile inputs; a gyroscope and/or an accelerometer 380 and/or any other sensor configured to detect motion of user device 102; and/or a display 390 for displaying digital images and/or video. As described in greater detail below, in some embodiments, program 350 may include a gift mobile application that may be a software application configured to run on user device 102. According to some embodiments, the gift mobile application may allow users to create, customize, send and receive electronic gifts as described further herein. In some embodiments, user input data may include biometric data associated with a user of user device 102 obtained by one or more sensors, such as a fingerprint scanner, a microphone, an image capture device, and the like. According to some embodiments, biometric data may be used to authenticate a user prior to creating, customizing, sending or utilizing an electronic gift. For example, in some embodiments, the gift mobile application may require a user to authenticate themselves using, for example, fingerprint data obtained from a fingerprint scanner of user device 102 prior to sending or using an electronic gift. It will be understood that other such authentication methods such as facial recognition, voice recognition, gesture recognition, username/password login, multi-factor authentication (e.g., sending a user an authentication code via an email or text message) and the like may also be used in a similar manner. In some embodiments, I/O device 320 may include a transceiver for sending and receiving wireless signals, such as Wi-Fi, cellular, Bluetooth, near-field communication, and any other such type of signal. In some embodiments, user device 102 may further include a peripheral interface, a mobile network interface in communication with processor 310, a bus configured to facilitate communication between the various components of user device 102, and/or a power source configured to power one or more components of user device 102. According to some embodiment, electronic gifts may be transmitted and stored using standard encryption techniques to add additional security. The various components of user device 102 may include the same or similar attributes or capabilities of the same or similar components discussed with respect to gift application server 120.

FIGS. 4A-B show example embodiments of user interfaces of a gift mobile application 402 being run on user device 102. According to some embodiments, gift mobile application 402 may be a software application that is configured to allow a gifter to create, customize and send a gift to a selected gift recipient using a first user device 102. According to some embodiments, a gift recipient may have a second user device 102 that may receive a gift sent by the gifter. In some embodiments, second user device 102 may receive the gift via gift mobile application 402 that is installed on second user device 102. In some embodiments, second user device 102 may not have gift mobile application 402 installed, but may be configured to receive the gift via, for example, an email or a text message. FIG. 4A shows an example embodiment of a user interface of gift mobile application 402 that is configured to allow a gifter to select a gift recipient and FIG. 4B shows an example embodiment of a user interface of gift mobile application 402 that is configured to allow a gifter to select and configure a gift to send to the selected gift recipient. According to some embodiments, gift mobile application 402 may facilitate communication between user device 102 and gift application server 120. In some embodiments, gift mobile application 402 may facilitate communication or the sending of messages between gifter user device 102 and gift recipient user device 102. For example, gift mobile application 402 may enable the gift recipient to record and send a thank you message to the gifter, or in some embodiments may initiate a telephonic or video link between gifter user device 102 and gift recipient user device 102 upon the gift recipient receiving or using the gift. According to some embodiments, if a telephonic or video link cannot be established immediately (e.g., due to a user being out of cell tower range), mobile application 402 may automatically attempt to establish the link upon detecting a user device 102 has reconnected to a network (e.g., Wi-Fi, cellular, etc.) or may intermittently try to establish the link upon after a period of time has passed.

According to some embodiments, user device 102 may provide gift mobile application 402 with access to a contacts list stored by user device 102, so that a user of gift mobile application 402 may select a stored contact as a gift recipient. As will be appreciated by those of skill in the art, a contacts list may comprise a plurality of records, where each record corresponds to an individual or entity and includes associated stored contact information such as a name, telephone number(s), address(es), and other such information. As shown in FIG. 4A, a user interface of gift mobile application 402 may allow a gifter to select a recent contact 404 as the gift recipient by selecting a displayed image or name associated with the recent contact 404. In some embodiments, a recent contact 404 may represent an individual that the gifter has given a gift to in the recent past via gift mobile application 402. In some embodiments, a recent contact 404 may represent an individual that a user has communicated with via user device 102 (e.g., via phone call, text message, email, etc.) in the recent past. According to some embodiments, a user interface of gift mobile application 402 may allow a gifter to specify a gift recipient by searching for a name of an individual using a text search field 406, which may cause gift mobile application 402 to perform a search of the contacts list stored on user device 102. According to some embodiments, a user interface of gift mobile application 402 may display some or all of a list of contacts 407 from which to select a gift recipient. In some embodiments, the displayed list of contacts 407 may be configured to scroll to reveal a different portion of the list in response to receiving a user input, such as a vertical swipe on a touchscreen of user device 102.

In some embodiments, gift mobile application 402 may be configured to allow a gifter to select a plurality of gift recipients and the gifter may specify whether an identical gift is to be sent to all of the gift recipients individually, or whether a single gift is to be sent to all of the gift recipients for their collective use. For example, a gifter may send three friends a gift of $100 to collectively spend at a particular restaurant, meaning that the gift will be exhausted when $100 is spent at the restaurant by any one of the gift recipients, or when the total amount of the gift is spent by adding up the expenditures of all three gift recipients at the restaurant. Furthermore, in some embodiments, a gifter may send a location-based group gift in which the gifter specifies a redemption location and conditions the gift on the occurrence that all gift recipients must be at the location to utilize the gift. For example, if a gifter wants two friends to meet for lunch, the gifter may create a gift to a particular restaurant but specify that both friends must be physically present at the restaurant in order for the gift to be used. In some embodiments, a gifter may specify an unknown gift recipient based on a specified merchant or location.

As shown in FIG. 4B, in some embodiments, a user interface of gift mobile application 402 may allow a gifter to select and/or configure a gift to send to a gift recipient by inputting or selecting a gift amount, which may also be referred to as a maximum gift amount, and one or more redemption locations. The gift amount may represent the maximum amount of value that may be withdrawn from an account associated with the gifter in relation to the gift. The one or more redemption merchants may represent merchants, ecommerce websites, stores, or locations at which the gift is authorized to be used. For example, the gift recipient may select a movie theater chain as the redemption merchant, which means that the gift recipient would only be authorized to redeem the gift at the specified movie chain. According to some embodiments, gift mobile application 402 may provide a number of predetermined gift amounts 408 that may be selected by the gifter. In some embodiments, the gifter may type in a customized gift amount via a gift amount input field. Gift mobile application 402 may provide a number of predetermined or recent redemption merchants 412 that may be selected by the gifter selecting an icon or button associated with the associated redemption merchant 412. According to some embodiments, gifter may search for redemption merchants by inputting the name of a desired redemption merchant into redemption merchant search field 412. According to some embodiments, gift application server 120 may store a list of redemption merchants that are compatible for use with system 100 and gift mobile application 402 may communicate with gift application server 120 in response to a search entered into redemption merchant search field 414 to receive search results. According to some embodiments, gift mobile application 402 may provide a list of redemption merchants 415 that may be displayed and manipulated in a manner similar to the list of contacts 407 shown in FIG. 4A. In some embodiments, gift mobile application 402 may allow a gifter to designate a type of redemption merchant instead of a particular redemption merchant. For example, instead of selecting a particular movie theater chain, the gifter may instead select "movie theaters," and system 100 may enable the gift to be used at a plurality of different movie theaters and chains of movie theaters based on a classification of the merchant determined by system 100 when the gift is redeemed.

Including and in addition to aspects shown in FIGS. 4A-B, in some embodiments, gift mobile application 402 may be configured to enable a gifter to specify or customize various other aspects of a gift, including, but not limited to, the gift recipient, the merchant identity, merchant type, redemption location, the amount of the gift, media associated with the gift (e.g., messages, images, videos, look and feel of the gift, artwork and the like sent in association with the gift), an account associated with the gifter from which to fund the gift, an account associated with the gift recipient for receiving payments or reimbursements relating to the gift, an expiration date and/or time of the gift after which the gift will no longer be valid for use, an authorized use date and/or time of the gift before which the gift may not be authorized for use, and an electronic locking mechanism associated with the gift that is described in greater detail below. Further, in some embodiments, gift mobile application 402 may be configured to send and/or receive messages from gift application server 120 or another user device 102. For example, in some embodiments, user device 102 associated with the gifter may receive notifications from application server 120 and/or user device 102 associated with the gift recipient, such as a notification that the gift recipient has redeemed the gift. Likewise, in some embodiments, user device 102 associated with the gift recipient may receive notification from application server 120 and/or user device 102 associated with the gifter, such as, for example, messages sent from the gifter or clues to assist in unlocking an electronic locking mechanism associated with a gift.

FIGS. 5A-B show example embodiments of electronic lock user interfaces of a gift mobile application 402 being run on user device 102. In particular, FIG. 5A shows an example embodiment of a user interface of gift mobile application 402 that is configured to present a gift recipient with an electronic lock and FIG. 5B shows an example embodiment of a user interface of gift mobile application 402 that shows user inputs to the electronic lock user interface that represent an attempt to unlock a gift being restricted for use by the electronic lock of gift mobile application 402.

As shown in FIG. 5A, an electronic lock may include an electronic lock prompt 504 and an electronic lock interface 506. According to some embodiments, electronic lock prompt 504 may represent a clue or instruction providing guidance to a gift recipient on how to solve the electronic lock. According to some embodiments, the electronic lock prompt 504 may be specified by the gifter at the time of creation of the gift by selecting a predetermined lock prompt 504 or by providing a customized lock prompt 504. In some embodiments, a lock prompt 504 may be associated with a lock solution that represents the input that must be entered into electronic lock interface 506 to unlock a gift, message, or other file that is being protected by the electronic lock. According to some embodiments, electronic lock interface 506 may comprise one or more fields that may receive user inputs, such as for example, a number of input boxes and spaces as shown in FIG. 5A. In some embodiments, the number of input boxes and spaces may be arranged and presented by electronic lock interface 506 to correspond to the number of characters and spacing associated with the lock solution. As shown in FIG. 5B, a gift recipient may input a lock input 508 to attempt to unlock the electronic lock. In the example shown in FIG. 5B, lock input 508 represents a song title corresponding to electronic lock prompt 504. According to some embodiments, gift mobile application 402 may locally store the lock solution associated with an electronic lock on user device 102. In such cases, gift mobile application 402 may unlock an associated file, such as an electronic gift, a media file, an image, a message, or any other such type of file, upon detecting that the gift solution has been correctly entered into electronic lock interface 506. According to some embodiments, upon detecting that an incorrect gift solution has been entered into electronic lock interface 506, gift mobile application 402 may cause user device 102 associated with the gift recipient to send an incorrect solution message to user device 102 associated with the gifter. The incorrect solution message may provide a notification that the gift recipient has entered an incorrect solution to the electronic lock and may provide the incorrect solution for the gifter's viewing and entertainment. According to some embodiments, the gift mobile application 402 may provide a messaging functionality that may allow the gifter to send additional clues to the gift recipient for viewing on user device 102. In some embodiments, gift mobile application 402 may provide a remote unlock functionality that allows the gifter to remotely unlock a gift sent to the gift recipient, so that the gifter may authorize the gift recipient to access and use the gift despite failed attempts at unlocking the gift. In some embodiments, gift mobile application 402 may be configured to enable a gifter to specify a maximum number of unlock attempts, such that in response to gift mobile application 402 determining that the gift recipient has incorrectly attempted to unlock the electronic lock beyond the maximum number of unlock attempts, then gift mobile application 402 may cancel the gift sent to the gift recipient and provide notifications to one or more of the gifter and the gift recipient that the gift has been cancelled due to the gift recipients failure to unlock the gift within the number of attempts specified by the gifter. According to some embodiments, an electronic lock may comprise an image that a user must trace or color in by swiping on a touchscreen associated with user device 102. For example, in some embodiments, the electronic lock may be configured to unlock if the gift recipient traces around a target image within an accuracy that falls within a predetermined confidence range.

While web server 110, location services server 112, transaction server 114, gift application server 120, merchant database terminal 126, merchant POS terminal 127, third party financial server 128 and user device 102 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the web server 110, location services server 112, transaction server 114, gift application server 120, a merchant database terminal 126, merchant POS terminal 127, third party financial server or user device 102 may include a greater or lesser number of components than those illustrated.

Figure 6:
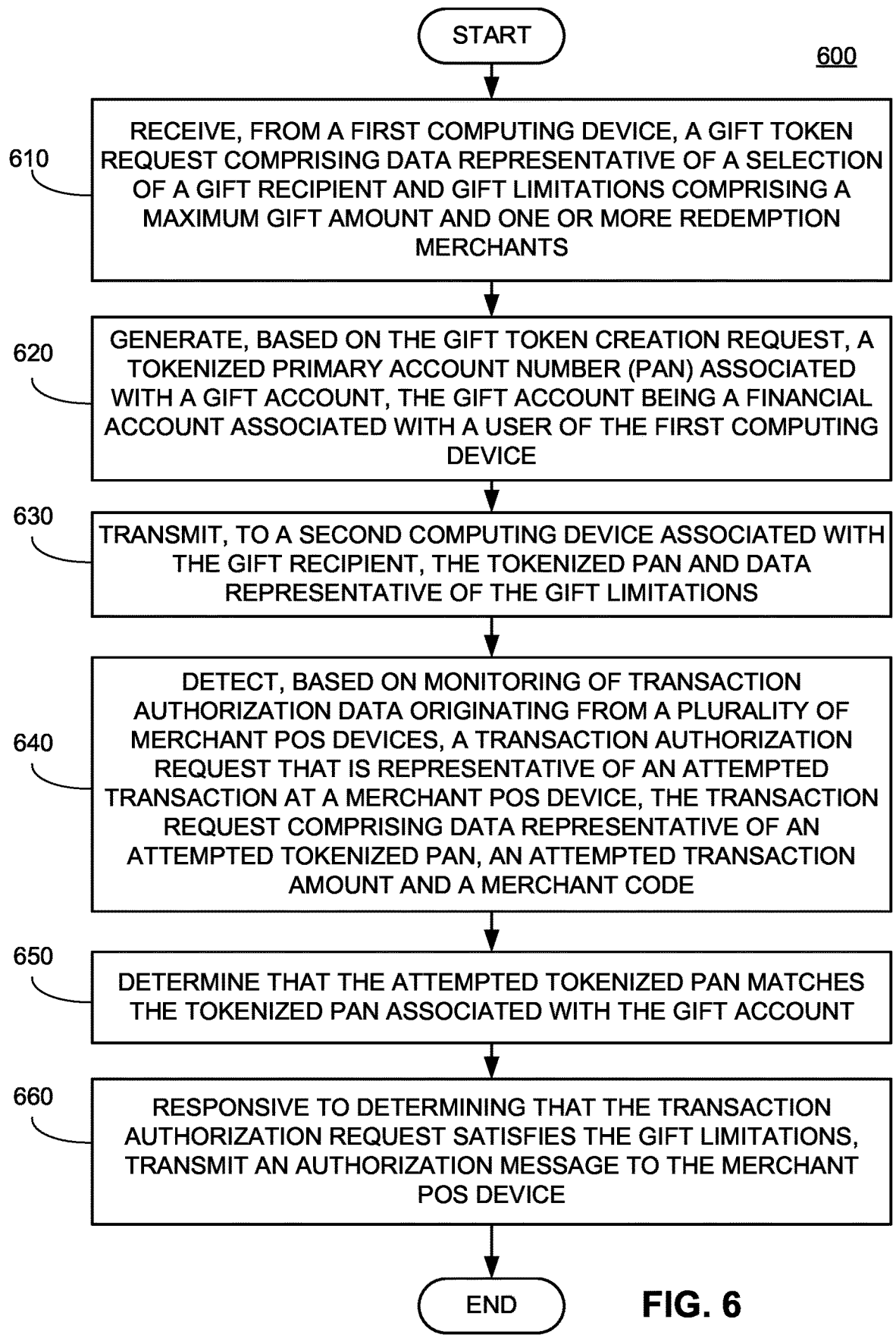
FIG. 6 is a flowchart of an exemplary method for providing a gift.

FIG. 6 shows a flowchart of a method 600 for providing a gift, such as an electronically conveyed financial gift. Method 600 may be performed by a system including some or all of web server 110, location services server 112, transaction server 114, database 118, gift application server 120, merchant database terminal 126, merchant POS terminal 127, third party financial server 128 and one or more user devices 102.

In block 610, the system (e.g., via gift application server 120) may receive a gift token creation request from a first computing device (e.g., via a first user device 120). According to some embodiments, the gift token creation request may include data representative of a selection of a gift recipient, gift limitations and/or a selection of a gift account from a plurality of financial accounts associated with the gifter. For example, in some embodiments, gift mobile application 402 installed on user device 102 of the gifter may be configured to select a friend from a contact list stored on user device 102 to designate as the gift recipient. Further, gift mobile application 402 may allow the gifter to customize the gift by inputting gift limitations associated with the gift. In some embodiments, the gift limitations may include, for example, a maximum gift amount, one or more redemption merchants, and/or a gift expiration date. According to some embodiments, the maximum gift amount may be the maximum amount of money that may be transferred out of a financial account associated with the gifter and sent to either a merchant or the gift recipient in response to redemption of the gift. According to some embodiments, gift application server 120 may maintain a gift account balance that tracks the amount of the gift remaining in the event that the gift recipient only redeems a portion of the gift. For example, if a gift is $50 and the gift recipient spends $30 on one transaction, gift application server 120 may adjust the remaining balance of the gift to be $20, which it may then designate as the new maximum gift amount. According to some embodiments, if a gift recipient attempt to make a purchase for more than the maximum amount of the gift, system 100 (e.g., gift application server 120 or transaction sever 114) may either reject the attempted transaction or may only allocate the maximum gift amount to the purchase. For example, if a gift is $50 and the gift recipient attempts to make a purchase of $60 using the gift, system 100 may either reject the transaction or may authorize $50 to be spent towards the purchase, requiring the gift recipient to provide the additional $10 by some other means of payment. According to some embodiments, gift limitations comprising one or more redemption merchants may represent one or more merchants at which the gift is authorized to be spent. For example, the gifter may specify a particular restaurant or chain of restaurants at which the gift is authorized to be redeemed. In some embodiments, the gift limitations may comprise a type of redemption merchant that represents a category of merchants at which the gift may be redeemed, such as restaurants, movie theaters, grocery stores, hotels, airlines, and the like. According to some embodiments, gift limitations may include a gift expiration date that represents a date upon which the gift expires and may no longer be redeemed. In some embodiments, the gift token creation request may include data representative of a selection of a gift account from a plurality of financial accounts associated with the gifter. For example, in some embodiments, gift mobile application 402 may allow a gifter to specify a financial account from which the gift shall be funded, by for example, selecting an account from one or more financial accounts associated with the gifter that are stored by gift mobile application 402. According to some embodiments, gift mobile application 402 may store credentials associated with the one or more financial accounts associated with the gifter that may be accessed by system 100 to initiate a transfer of funds from a selected gift account.

In block 620, the system (e.g., via gift application server 120) may generate a tokenized primary account number (PAN) associated with the gift account. In some embodiments, a tokenized PAN may be a 16-digit number associated with the gift account. For example, in some embodiments the tokenized PAN may be a 16-digit number that corresponds to the gift account that is associated with a credit card number of the gifter. Accordingly, in some embodiments, the tokenized PAN may be a 16-digit number that does not match any previously issued credit card number, but that is associated with a credit card account of the gifter such that when the tokenized PAN is used to make a gift-eligible purchase, the money for the purchase is debited to the associated credit card account of the gifter. According to some embodiments, the tokenized PAN may be generated based on the gift token creation request. In some embodiments, the gift account may be a financial account that is associated with a user of the first computing device.

In block 630, the system (e.g. via web server 110) may transmit the tokenized PAN and data representative of the gift limitations to a second computing device that may be associated with the gift recipient. According to some embodiments, the tokenized PAN may be in a format that allows it to be stored in a digital wallet of the user device 102 associated with the gift recipient. For example, in some embodiments, a tokenized PAN may be an image file such as a .jpeg or other such image file type. In some embodiments, the tokenized PAN may be of a type configured to be received by an API associated with the digital wallet. According to some embodiments, transmitting the tokenized PAN may include transmitting an image. For example, in some embodiments, transmitting the tokenized PAN may include transmitting an image of a credit card that displays a number matching the tokenized PAN. In some embodiments, the image may include a scannable feature, such as a bar code or QR code, that may be used to convey the tokenized PAN to merchant terminal 127 in response to be scanned or captured by an image capture device associated with merchant terminal 127.

In block 640, the system (e.g. transaction server 114) may detect a transaction authorization request that is representative of an attempted transaction at a merchant POS device. According to some embodiments, the system may detect the transaction authorization request based on monitoring of transaction authorization data originating from a plurality of merchant POS devices (e.g., merchant POS devices 172, 174, 176). For example, in some embodiments, transaction server 114 may receive a real-time stream of transaction authorization requests originating at a merchant, from for example, self-checkout kiosks, card readers associated with cash registers, websites where a user has entered a credit card or gift card number, and the like. In some embodiments, if the entity associated with organization 108 is different than an entity associated with a financial account utilized by a purchaser, transaction server 114 may receive a plurality of transaction authorization requests in a batch at one time. In some embodiments, a transaction authorization request may comprise data representative of one or more of an attempted tokenized PAN, an attempted transaction amount, a merchant code and an attempted transaction date and/or time. For example, if a gift recipient attempts to buy an item at a merchant using a tokenized PAN, the tokenized PAN used by the gift recipient may be represented in the transaction authorization request as the attempted tokenized PAN. Likewise, the amount of the attempted purchase may be represented as the attempted transaction amount. In some embodiments, a merchant code may represent a code from which transaction server 114 may identify the identity of the merchant at which the attempted purchase is being made and/or the type of merchant (i.e., restaurant, movie theater, etc.). According to some embodiments, the geographic location and/or address of the merchant at which the attempted purchase is made may be determined by location services server 112 by looking up an address of the merchant in response to identifying the merchant based on the merchant code.

In block 650, the system (e.g. transaction server 114) may determine that the attempted tokenized PAN matches the tokenized PAN associated with the gift account. According to some embodiments, transaction server 114 may maintain a list of one or more financial account numbers of tokenized PANs that correspond to gifts created by gifters. Transaction server 114 may monitoring the incoming transaction authorization requests to flag and/or identify attempted transactions that correspond with a gift. In this manner, transaction server 114 can identify transactions that are associated with gifts ("gift transactions") that were provided via system 100. In some embodiments, transaction server 114 may identify gift transactions in real time, based on the monitoring of transaction authorization requests received in real time. In some embodiments, transaction server 114 may identify gift transactions intermittently based on monitoring of transaction authorization requests received in batches. According to some embodiments, transaction server 114 receive a combination of real-time and batch transaction authorization requests and may thus identify some gift transactions in real time and some upon receiving and process a batch of transaction authorization requests.

In block 660, the system (e.g. transaction server 114) may transmit an authorization message to the merchant POS device in response to determining that the transaction authorization request satisfies the gift limitations. According to some embodiments, determining that a transaction authorization request satisfies the gift limitations may include identifying an attempted transaction merchant associated with the attempted transaction based on the merchant code, determining that the attempted transaction merchant matches one of the one or more redemption merchants and/or determining that the attempted transaction date chronologically precedes the gift expiration date. For example, if a particular gift had associated gift limitations that specified that the gift could only be used at a movie theater for a maximum gift amount of $50, transaction server 114 may identity an attempted transaction having an attempted tokenized PAN that matches a stored tokenized PAN that is associated with a gift to determine that the attempted transaction is being made using the tokenized PAN that is associated with the gift and then transaction server 114 may compare the gift limitations associated with the stored tokenized PAN to the characteristics of the transaction to determine that the attempted transaction amount is less than the $50 limit and that, based on the merchant code, the attempted transaction is occurring at merchant POS terminal 127 associated with a movie theater. Thus, in this example, upon determining that the gift limitations have been satisfied, transaction server 114 may transmit an authorization message to merchant POS terminal 127 that indicates that the transaction has been authorized. The authorization message may represent an authorization of the attempted purchase that may cause merchant POS terminal 127 to authorize the transaction at the merchant location. In some embodiments, if transaction server 114 determines that the gift limitations are not satisfied, transaction server 114 may send a rejection message to merchant POS terminal 127 representing a rejection of the attempted transaction.

In some embodiments, upon authorizing a transaction, transaction server 114 may output an instruction to debit the gift account associated with the tokenized PAN with an amount equal to the attempted transaction amount if the attempted transaction amount is less than the maximum gift amount (or the remaining balance of the gift, if a prior gift transaction has been made) or the maximum gift amount if the attempted transaction amount is greater than or equal to the maximum gift amount. In some embodiments, the method may include determining a remaining gift amount that is equal to the maximum gift amount minus the amount debited to the gift account. Accordingly, system 100 may maintain a gift balance that tracks how much of the original gift has been spent and how much is remaining. In some embodiments, the method may include transmitting a notification representing the remaining gift amount to user device 102 associated with the gift recipient, so that the gift recipient can be informed as the remaining balance of the gift. In some embodiments, a similar notification may be transmitted to user device 102 associated with the gifter so that the gifter may also be informed when a gift has been redeemed and what the remaining balance is. According to some embodiments, gift mobile application 402 may be configured to display a remaining balance associated with a gift so that the gifter and/or gift recipient may view the remaining balance of one or more gifts at any time.

In this way, system 100 allows a gifter to provide a gift to a gift recipient in a manner such that that the purchase of the gift is charged directly to a specified financial account of the gifter. Thus, if the gift is never used or is lost, the gifter's account will not be charged. In some embodiments, if the attempted purchase amount is more than the gifted amount, the gifter will only be charged with the maximum gift amount. Further, if less than the entire gift is used, the gifter's account will only be charged for the actual amount of the gift that was redeemed, thereby preventing the gifter from wasting money on some or all of a gift that is never redeemed.

Figure 7:
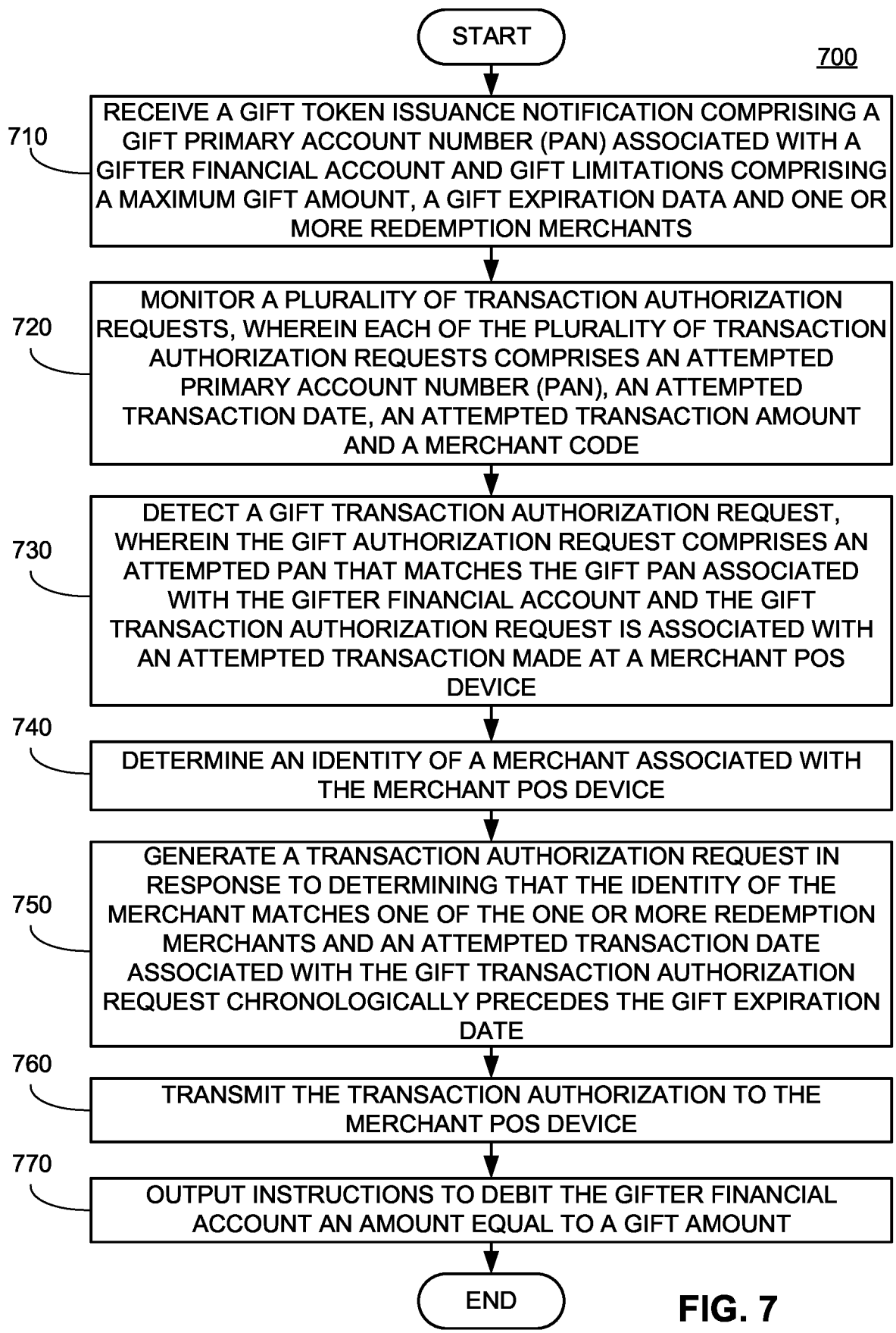
FIG. 7 is a flowchart of another exemplary method for providing a gift.

FIG. 7 shows a flowchart of a method 700 for providing a gift, such as an electronically conveyed financial gift. Method 700 may be performed by a system including some or all of web server 110, location services server 112, transaction server 114, database 118, gift application server 120, a merchant database terminal 126, merchant POS terminal 127, third party financial server 128 and one or more user devices 102.

In block 710, the system (e.g., via transaction server 114) may receive a gift token issuance notification. According to some embodiments, the gift token issuance notification may comprise a gift primary account number (PAN) associated with a gifter financial account and gift limitations. In some embodiments, the gift limitations may comprise a maximum gift amount, a gift expiration date and one or more redemption merchants. In some embodiments, the gift token issuance notification may include some or all of the same types of data described above with respect to a gift token creation request in step 610. In some embodiments, the gifter financial account may be a financial account that was selected by the gifter at the time of creating the gift.

In block 720, the system (e.g., via transaction listener 115) may monitor a plurality of transaction authorization requests. According to some embodiments, each of the plurality of transaction authorization requests may comprise an attempted primary account number (PAN), an attempted transaction date, an attempted transaction amount and a merchant code.

In block 730, the system (e.g., transaction server 114) may detect a gift transaction authorization request. According to some embodiments, the detection of the gift transaction authorization request may be based on the monitoring of the plurality of transaction authorization requests. In some embodiments, the gift transaction authorization request detected by the system may comprise an attempted PAN that matches the gift PAN associated with the gifter financial account. In some embodiments, the gift transaction authorization request may be associated with an attempted transaction made at a merchant POS device (e.g., merchant POS device 172).

In block 740, the system (e.g., transaction server 120) may determine an identity of a merchant associated with the merchant POS device. According to some embodiments, the system may determine the identity of the merchant associated with the merchant POS device based on the merchant code of the gift transaction authorization request. In some embodiments, determining the identity of the merchant associated with the merchant POS device may include comparing the merchant code with a table of merchant codes and merchant identities, wherein each merchant code in the table is associated with a merchant identity. For example, in some embodiments, the system (e.g., transaction server 114) may store a table of merchants that correspond with merchant codes or other information that may be derived from a merchant code, so that the system may look up the identity of the merchant based on the merchant code.

In block 750, the system (e.g., transaction server 114) may generate a transaction authorization in response to determining that the identity of the merchant matches one of the one or more redemption merchants and an attempted transaction date associated with the gift transaction authorization request chronologically precedes the gift expiration date. According to some embodiments, in response to determining that the current date is chronologically past the gift expiration date, the system may delete the gift token issuance notification comprising the gift PAN. Accordingly, in some embodiments, if a gift has an associated expiration date and the expiration date passes, the system (e.g., transaction server 114) may delete the gift token issuance notification and associated data so that the system will no search for the associated gift token when monitoring transaction authorization request data.

In block 760, the system (e.g., transaction server 114) may transmit the transaction authorization to the merchant POS device.

In block 770, the system (e.g. transaction server 114) may output instructions to debit the gifter financial account an amount equal to a gift amount. According to some embodiments, the gift amount may be an attempted transaction amount associated with the gift transaction authorization request. For example, if the gift recipient makes an attempted purchase that cost $30 in association with the gift PAN, then the gift amount may be $30. According to some embodiments, the gift amount may be equal to the maximum gift amount or a remaining balance of the gift. For example, in the maximum gift amount or remaining balance of the gift is $50 and the gift recipient makes a purchase that costs $60 using the gift PAN, then the gift amount may be $50.

Figure 8:
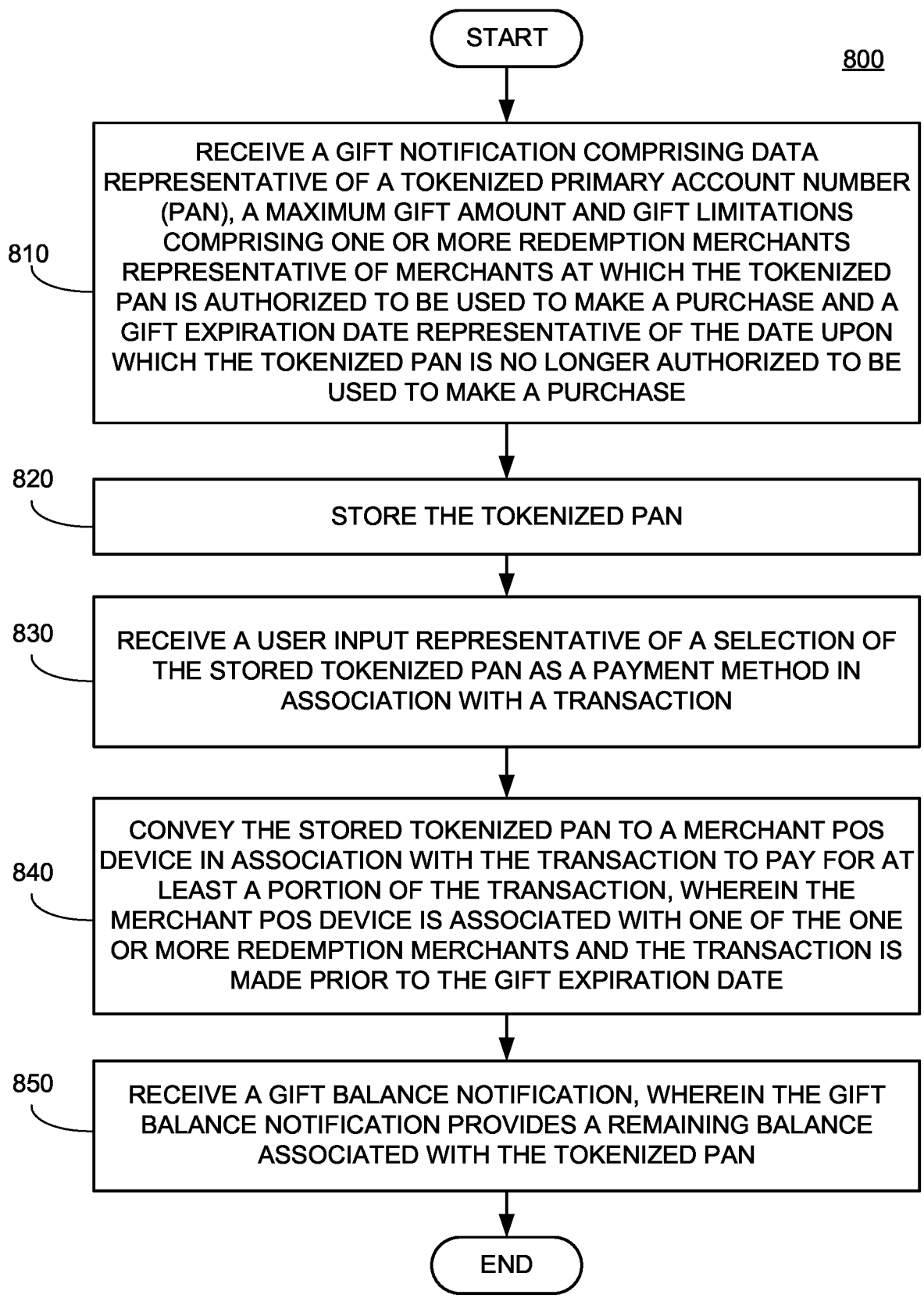
FIG. 8 is a flowchart of another exemplary method for providing a gift.

FIG. 8 shows a flowchart of a method 800 for providing a gift, such as an electronically conveyed financial gift. Method 800 may be performed by a system including some or all of web server 110, location services server 112, transaction server 114, database 118, gift application server 120, a merchant database terminal 126, merchant POS terminal 127, third party financial server 128 and one or more user devices 102.

In block 810, the system (e.g., via user device 102) may receive a gift notification comprising data representative of a tokenized primary account number (PAN), a maximum gift amount and gift limitations. For example, a mobile device associated with a gift recipient may receive a gift notification that notifies the gift recipient of the issuance of the gift, the amount the gift is for, and any restrictions on the gift, such as locations at which the gift may be redeemed. According to some embodiments, the gift limitations may comprise one or more redemption merchants representative of merchants at which the tokenized PAN is authorized to be used to make a purchase and a gift expiration date representative of the date upon which the tokenized PAN is no longer authorized to be used to make a purchase. According to some embodiments, the gift notification may further comprise virtual lock data representative of a password required to access the tokenized PAN for use to make a purchase and user device 102 may provide access to the tokenized PAN for use to make a purchase in response to receiving a user input representative of the password.

In block 820, the system (e.g., via user device 102) may store the tokenized PAN. In some embodiments, the tokenized PAN may be stored in a digital wallet of user device 102. In some embodiments, the tokenized PAN may be stored as an image on user device 102.

In block 830, the system (e.g., user device 102) may receive a user input representative of a selection of the stored tokenized PAN as a payment method in association with a transaction. For example, in some embodiments, gift mobile application 402 may include a user interface that allows the gift recipient to select one or more stored tokenized PANs for use as a payment method in a transaction. In some embodiments, the digital wallet of user device 102 may allow the gift recipient to select a stored tokenized PAN for use as a payment method in a transaction. In some embodiments, a gift recipient may select a tokenized PAN for use as a payment method by loading an image of the tokenized PAN to be scanned or imaged by merchant POS terminal 127.

In block 840, the system (e.g., user device 102) may convey the stored tokenized PAN to a merchant POS device in association with the transaction to pay for at least a portion of the transaction. For example, the gift recipient may be checking out at a store and may utilize the tokenized PAN to pay for a transaction by conveying the tokenized PAN to a merchant POS device associated with merchant POS terminal 127. In some embodiments, the tokenized PAN may be conveyed to merchant POS terminal 127 by using near-field communication (NFC) or by displaying an image that may be optically scanned or captured by an image capture device associated with merchant POS terminal 127. In some embodiments, the gift recipient may convey the tokenized PAN by typing the tokenized PAN into a keypad associated with merchant POS terminal 127. According to some embodiments, the merchant POS device may be associated with one of the one or more redemption merchants so that a gift limitation associated with the gift is satisfied and the gift is authorized for use. In some embodiments, the transaction may be made prior to a gift expiration date associated with the gift to satisfy another gift limitation that may be associated with the gift.

In block 850, the system (e.g. user device 102) may receive a gift balance notification. In some embodiments, the gift balance notification may provide a remaining balance associated with the tokenized PAN. For example, if the original gift was for $50 and the gift recipient makes a $30 purchase using the tokenized PAN, user device 102 associated with the gift recipient may receive a notification with information representing that the balance associated with the tokenized PAN is now $20.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use case describes an examples of a typical user flow pattern. They are intended solely for explanatory purposes and not in limitation. A first person (the "gifter") may want to provide a gift to a friend (the "gift recipient") to a particular merchant, such as a particular restaurant. To create the gift, the gifter may open a mobile application (e.g., gift mobile application 402) on their smart phone (e.g., via user device 102) and use the mobile application to select the friend as the gift recipient. The gifter may specify which financial account they want to use to fund the gift ("gift account") by selecting, for example, a particular credit card account that is associated with their user account in the mobile application. The gifter may select or input a maximum amount of the gift, such as $50, and may designate other restrictions, such as for example, that the gift may only be redeemed at the specified restaurant. The gifter may also specify for example, that the gift may not be used until on or after the gift recipient's birthday, or that the gift must be used before a certain date or it will expire. After the user customizes the gift, the gifter's smart phone may send a notice to the system (e.g., gift application server 120) which may then create a tokenized PAN that corresponds to the selected gift account and may transmit the tokenized PAN to a mobile device associated with the gift recipient. The gift recipient may receive the tokenized PAN either through the mobile application or, if not registered with the mobile application, via a text message or email. The tokenized PAN may be stored in a digital wallet of the gift recipient's mobile device or may be stored as an image. The gift recipient may also receive a message providing details about the gift, such as who it is from, how much it is for, and what restrictions have been placed on the gift. In some instances, the gifter may designate a locking mechanism to be included with the gift, so that the gift recipient may have to, for example, solve a puzzle before being able to access the gift. The gift recipient may redeem the gift by using their digital wallet to process a payment based on the tokenized PAN using for example, near-field communication with a merchant POS device. When an attempted transaction is made, the merchant (e.g., merchant POS terminal 127) may send an authorization request to the system and the system (e.g., via transaction server 114) may authorize the transaction after determining that the tokenized PAN is being used in accordance with the associated restrictions. For example, before authorizing the transaction, the system (e.g., via transaction server 114) may determine that the merchant at which the attempted purchase is being made is the restaurant that was specified during the gift creation process. If an attempted purchase is made using the tokenized PAN at a restaurant that is not the restaurant specified during the gift creation process, the system will reject the transaction. Once the gift transaction is authorized, the system (e.g., via transaction server 114) will notify the merchant to allow the purchase and will cause the amount of the purchase to be debited to the credit card account of the gifter that was selected as the gift account, provided that the purchase amount is less than or equal to a remaining balance of the gift. In this way, the gifter may provide a customized gift to a friend, and will only be charged for the gift if and when it is actually used.

Although the above use case is described with respect to a gifter providing a gift to a gift recipient, other use cases are also contemplated. For example, the system described herein may be used in a manner similar to that described above by a parent to provide a child with money that is only to be used for a particular purpose (e.g., at a particular establishment during a particular time). The system described herein may also be used by an individual for managing personal spending. For example, a user may utilize the system to send themselves a gift to a particular store that has a maximum redemption value, such that the user may not spend more than the allotted amount at the store. The system may be used to send gifts to multiple people and may also be used by merchants or other organizations to send gifts to individuals. It should be understood that the example use cases provided herein are only exemplary and that many additional such uses are contemplated.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A method for providing an electronically-conveyed financial gift comprising:
   providing computer implemented instructions and executing the provided computer implemented instructions, the instructions comprising:
   receiving, by a gift application server and from a first computing device, a gift creation request comprising data representative of a selection of a gift recipient;
   generating, by the gift application server and based on the gift creation request, a primary account number (PAN) associated with a gift account, the gift account being a financial account associated with a user of the first computing device;
   transmitting, to the second computing device associated with the gift recipient, the PAN and an electronic lock prompt comprising a clue for providing guidance to the gift recipient on how to unlock the electronic lock and an electronic lock interface, wherein the electronic lock prompt prevents the use of the PAN until the electronic lock prompt is unlocked;
   receiving, by the gift application server and from the second computing device via the electronic lock interface, an attempted lock solution;
   determining by the gift application server whether the attempted lock solution matches the lock solution; and
   responsive to determining that the attempted lock solution matches the lock solution, allow the use of the PAN in a transaction;
   responsive to determining that the attempted lock solution does not match the lock solution, transmit, via the gift application server, a failed attempt notification to the first computing device, wherein the failed attempt notification comprises the attempted lock solution;
   receiving, by the gift application server and from the first computing device, a remote unlock instruction allowing the use of the PAN in the transaction despite a failed unlock attempt.

2. The method of claim 1, the instructions further comprising:
   transmitting to the second computing device data representative of gift limitations; and
   determining that the transaction authorization request satisfies the gift limitations, wherein the gift creation request further comprises data representative of the gift limitations comprising a maximum gift amount and one or more redemption merchants;
   detecting, based on monitoring of transaction authorization data originating from a plurality of merchant POS devices, a transaction authorization request that is representative of an attempted transaction at a merchant POS device, the transaction authorization request comprising data representative of:
   an attempted PAN;
   an attempted transaction amount; and
   a merchant code;
   determining that the attempted PAN matches the PAN associated with the gift account; and
   responsive to determining that the attempted PAN matches the PAN associated with the gift account, transmit, by the transaction server, an authorization message to the merchant POS device, wherein the authorization message represents an authorization of an attempted purchase.

3. The method of claim 2, wherein determining that the transaction authorization request satisfies the gift limitations comprises:
   identifying an attempted transaction merchant associated with the attempted transaction based on the merchant code; and determining that the attempted transaction merchant matches one of the one or more redemption merchants.

4. The method of claim 3, the instructions further comprising: debiting the gift account an amount that is equal to:
the attempted transaction amount if the attempted transaction amount is less than the maximum gift amount; or
the maximum gift amount if the attempted transaction amount is greater than or equal to the maximum gift amount.

5. The method of claim 4, the instructions further comprising:
determining a remaining gift amount that is equal to the maximum gift amount minus the amount debited to the gift account; and
transmitting, to the second computing device, a notification representing the remaining gift amount.

6. The method of claim 3, further comprising:
responsive to determining that the transaction authorization request does not satisfy the gift limitations, sending a rejection message to the merchant POS device representing a rejection of the attempted transaction.

7. The method of claim 2, wherein the gift limitations further comprise a gift expiration date and the transaction authorization request further comprises an attempted transaction date.

8. The method of claim 7, wherein determining that the transaction authorization request satisfies the gift limitations further comprises:
determining that the attempted transaction date chronologically precedes the gift expiration date.

9. The method of claim 2, wherein the gift token creation request further comprises data representative of a selection of the gift account from a plurality of financial accounts associated with the user of the first computing device.

10. The method of claim 2, wherein:
transmitting the PAN comprises transmitting data configured to be stored in a digital wallet of the second computing device, and
the PAN is a 16-digit number.

11. The method of claim 2, wherein transmitting the PAN comprises transmitting an image for display by the second computing device.

12. The method of claim 11, wherein the image comprises a bar code that may be used to convey the PAN to the merchant POS device in response to being scanned or captured by an image capture device associated with the merchant POS device.

13. The method of claim 11, wherein the image comprises a quick response (QR) code that may be used to convey the PAN to the merchant POS device in response to being scanned or captured by an image capture device associated with the merchant POS device.

14. The method of claim 2, wherein generating the PAN comprises:
generating a new PAN number that does not match any of a plurality of pre-existing PAN numbers; and
associating the new PAN number with the gift account.

15. The method of claim 2, wherein monitoring of transaction authorization data originating from a plurality of merchant POS devices is performed in real-time.

16. The method of claim 2, wherein monitoring of transaction authorization data originating from a plurality of merchant POS devices is performed intermittently at intervals.

17. A method for providing an electronically-conveyed financial gift comprising:
providing computer implemented instructions and executing the provided computer implemented instructions, the instructions comprising:
receiving, by a gift application server and from a first computing device, a gift creation request comprising data representative of a selection of a gift recipient;
generating, by the gift application server and based on the gift creation request, a gift token;
transmitting, to the second computing device associated with the gift recipient, the gift token and an electronic lock prompt comprising a clue for providing guidance to the gift recipient on how to unlock the electronic lock and an electronic lock interface;
determining whether an attempted lock solution previously received from the second computing device via the electronic lock interface matches the lock solution;
responsive to determining that the attempted lock solution matches the lock solution, allow the user of the gift token to conduct a transaction;
responsive to determining that the attempted lock solution does not match the lock solution, transmit, via the gift application server, a failed attempt notification to the first computing device; and
receiving, by the gift application server and from the first computing device, a remote unlock instruction allowing the use of the gift token in the transaction despite a failed unlock attempt.

18. The method of claim 17, the instructions further comprising:
detecting, based on monitoring of transaction authorization data originating from a plurality of merchant POS devices, a transaction authorization request that is representative of an attempted transaction at a merchant POS device, the transaction authorization request comprising data representative of:
an attempted tokenized PAN;
an attempted transaction amount; and
a merchant code;
determining that the attempted tokenized PAN matches the tokenized PAN associated with the gift account; and
responsive to determining that the attempted tokenized PAN matches the tokenized PAN associated with the gift account, transmit, by the transaction server, an authorization message to the merchant POS device, wherein the authorization message represents an authorization of an attempted purchase.

19. A method for providing an electronically-conveyed financial gift comprising:
providing computer implemented instructions and executing the provided computer implemented instructions, the instructions comprising:
generating, by a gift application server, a primary account number (PAN) associated with a gift account, the gift account being a financial account associated with a user of the first computing device;
transmitting, to the second computing device associated with the gift recipient, the PAN and an electronic lock prompt comprising a clue for providing guidance to the gift recipient on how to unlock the electronic lock and an electronic lock interface;
receiving, by the gift application server and from the second computing device via the electronic lock interface, an attempted lock solution;
determining whether the attempted lock solution matches the lock solution; and responsive to determining that the attempted lock solution matches the lock solution, allow the use of the tokenized PAN in a transaction;

responsive to determining that the attempted lock solution does not match the lock solution, transmit, via the gift application server, a failed attempt notification to the first computing device; and receiving, by the gift application server and from the first computing device, a remote unlock instruction allowing the use of the tokenized PAN in the transaction despite a failed unlock attempt.

20. The method of claim 19, the instructions further comprising:

detecting, based on monitoring of transaction authorization data originating from a plurality of merchant POS devices, a transaction authorization request that is representative of an attempted transaction at a merchant POS device, the transaction authorization request comprising data representative of:

an attempted tokenized PAN;

an attempted transaction amount; and a merchant code;

determining that the attempted tokenized PAN matches the tokenized PAN associated with the gift account;

responsive to determining that the attempted tokenized PAN matches the tokenized PAN associated with the gift account, transmit, by the transaction server, an authorization message to the merchant POS device, wherein the authorization message represents an authorization of an attempted purchase.

* * * * *